US008579172B2

(12) United States Patent  
Monaco et al.

(10) Patent No.: US 8,579,172 B2
(45) Date of Patent: *Nov. 12, 2013

(54) CASES AND COVERS FOR ELECTRONIC HANDHELD DEVICES

(75) Inventors: Dean Monaco, Christmas, FL (US); John Santo, III, Orlando, FL (US)

(73) Assignee: Eat Dirt, LLC, Orlando, FL (US)

( * ) Notice: Subject to any disclaimer, the term of this patent is extended or adjusted under 35 U.S.C. 154(b) by 274 days.

This patent is subject to a terminal disclaimer.

(21) Appl. No.: 13/074,943

(22) Filed: Mar. 29, 2011

(65) Prior Publication Data

US 2012/0074006 A1 Mar. 29, 2012

Related U.S. Application Data

(63) Continuation-in-part of application No. 12/748,765, filed on Mar. 29, 2010, now Pat. No. 8,485,404, and a continuation-in-part of application No. 29/358,510, filed on Mar. 29, 2010, now Pat. No. Des. 654,068.

(51) Int. Cl.
*A45F 5/00* (2006.01)
*A45F 3/00* (2006.01)

(52) U.S. Cl.
USPC ............ 224/666; 224/269; 224/191; 224/668

(58) Field of Classification Search
USPC .......... 224/666, 269, 197, 191, 668; 206/320; 81/3.07, 3.09
See application file for complete search history.

(56) References Cited

U.S. PATENT DOCUMENTS

| 4,474,087 | A | * | 10/1984 | Widman | 81/3.09 |
| 4,569,653 | A | | 2/1986 | Becker | |
| 4,846,024 | A | * | 7/1989 | Bryant et al. | 81/3.09 |

(Continued)

FOREIGN PATENT DOCUMENTS

| DE | 10014423 | 10/2001 |
| EP | 1030497 | 8/2000 |
| EP | 1484901 | 12/2004 |

OTHER PUBLICATIONS

Monaco, et al., International Search Report received from the Patent Office for PCT/US11/30374, 11 pgs.

*Primary Examiner* — Nathan J Newhouse
*Assistant Examiner* — Lester L Vanterpool
(74) *Attorney, Agent, or Firm* — Brian S. Steinberger; Law Offices of Brian S. Steinberger, P.A.

(57) ABSTRACT

Holders for supporting portable handheld electronic devices, such as but not limited to iPhones®, IPODS®, IPADS™, cellular phones, and the like. Another embodiment has a portable handheld electronic device holder with a built on bottle opener, where the bottle opener in the outer face of a slightly raised box shape on the upper back of the case. The bottle opener can also be attached to a tab that slides in and out of the casing when needed. The bottle opener can include one or a pair of upwardly extending triangular tabs (with blunt tips) that can be used to pry open can tabs on soda and beer cans. A belt clip adapter can snapably fit into the bottle cap opener to allow the holder to attach to belts and pockets. A spring biased version also allows the belt clip adapter to be attachable detachable from the bottle cap opener holders. The belt clip adapter can include a bendable disc(s) to fit into the bottle cap opener, or into a keyhole slot on the back of a case holder.

14 Claims, 37 Drawing Sheets

(56) References Cited

U.S. PATENT DOCUMENTS

| | | | |
|---|---|---|---|
| 4,911,038 A * | 3/1990 | Ferrin | 81/3.09 |
| 4,923,392 A * | 5/1990 | Moynihan, III | 431/253 |
| 5,531,365 A | 7/1996 | Donnelly | |
| 5,906,031 A * | 5/1999 | Jensen | 24/3.12 |
| 6,456,487 B1 * | 9/2002 | Hetterick | 361/679.3 |
| 6,646,864 B2 * | 11/2003 | Richardson | 361/679.3 |
| 6,752,299 B2 * | 6/2004 | Shetler et al. | 224/197 |
| 6,786,372 B2 * | 9/2004 | Enkerlin et al. | 224/271 |
| 7,230,823 B2 | 6/2007 | Richardson | |
| 7,240,589 B2 * | 7/2007 | Kehoe | 81/3.09 |
| D557,089 S * | 12/2007 | Menard | D8/34 |
| D564,220 S * | 3/2008 | Dixon | D3/218 |
| 7,409,237 B2 | 8/2008 | Tages | |
| 7,494,239 B2 * | 2/2009 | Riccardi | 362/109 |
| 7,513,472 B2 * | 4/2009 | Yang | 248/231.81 |
| 7,648,027 B2 | 1/2010 | Lin | |
| 7,722,388 B1 * | 5/2010 | Michaeli et al. | 439/534 |
| D621,822 S * | 8/2010 | Richardson et al. | D14/250 |
| 7,778,023 B1 * | 8/2010 | Mohoney | 361/679.41 |
| D624,910 S * | 10/2010 | Richardson et al. | D14/250 |
| 8,016,107 B2 * | 9/2011 | Emsky | 206/320 |
| D651,205 S * | 12/2011 | Soekoro | D14/250 |
| D662,378 S * | 6/2012 | Corredor Londono | D8/38 |
| D662,380 S * | 6/2012 | Corredor Londono | D8/38 |
| D666,070 S * | 8/2012 | Shaashua et al. | D8/40 |
| 8,251,210 B2 * | 8/2012 | Schmidt et al. | 206/320 |
| D666,885 S * | 9/2012 | Shaashua et al. | D8/40 |
| 8,333,310 B2 * | 12/2012 | Tages | 224/197 |
| D674,380 S * | 1/2013 | Soekoro | D14/250 |
| 2002/0048363 A1 | 4/2002 | Scheller | |
| 2004/0204165 A1 | 10/2004 | Huang | |
| 2005/0255898 A1 | 11/2005 | Huang | |
| 2006/0058081 A1 | 3/2006 | Reichenbach | |
| 2006/0146483 A1 | 7/2006 | Patino | |
| 2008/0009329 A1 | 1/2008 | Adler | |
| 2008/0156836 A1 * | 7/2008 | Wadsworth et al. | 224/269 |
| 2008/0201862 A1 * | 8/2008 | Menard-Flanagan | 7/151 |
| 2008/0232089 A1 | 9/2008 | Riccardi | |
| 2010/0224519 A1 * | 9/2010 | Kao | 206/320 |
| 2011/0031287 A1 * | 2/2011 | Le Gette et al. | 224/101 |
| 2011/0036876 A1 * | 2/2011 | Fathollahi | 224/191 |
| 2011/0136555 A1 * | 6/2011 | Ramies et al. | 455/575.8 |
| 2011/0253569 A1 * | 10/2011 | Lord | 206/320 |
| 2012/0325882 A1 * | 12/2012 | Tages et al. | 224/676 |

* cited by examiner

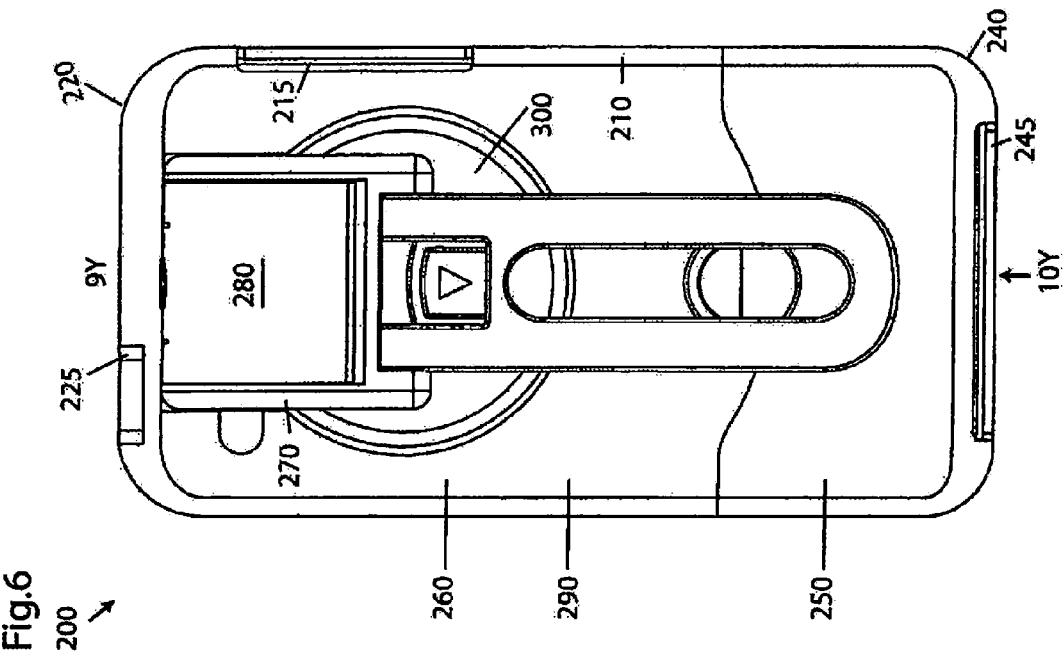
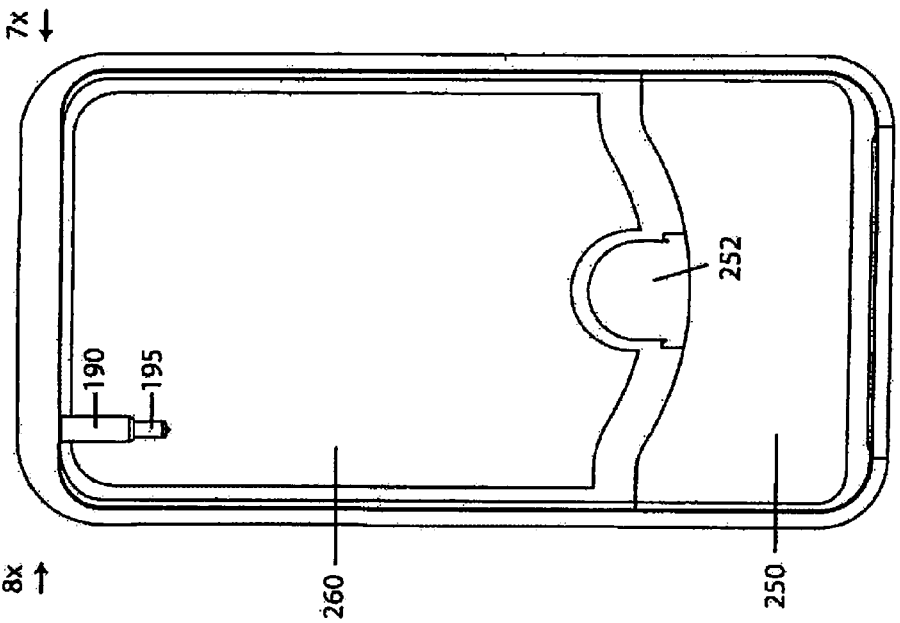

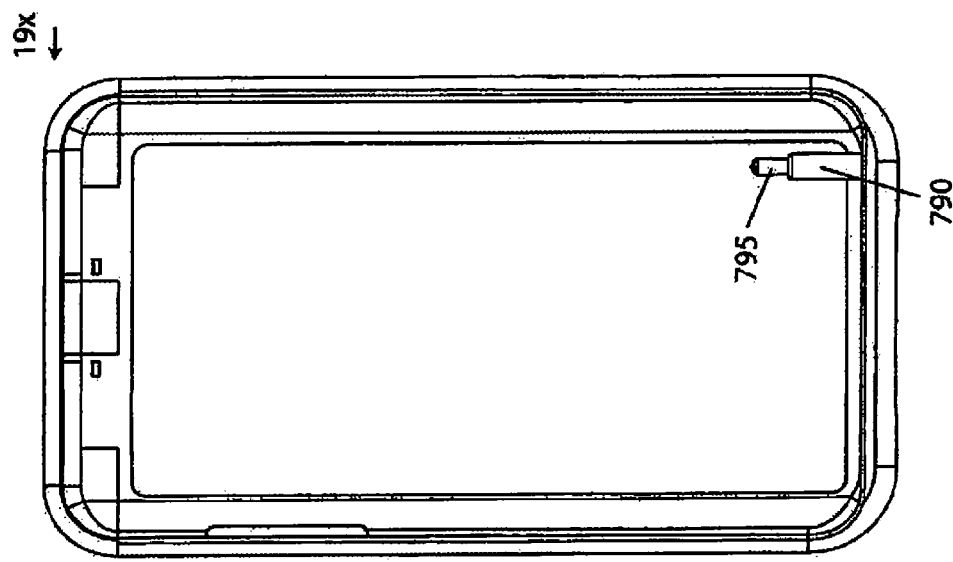
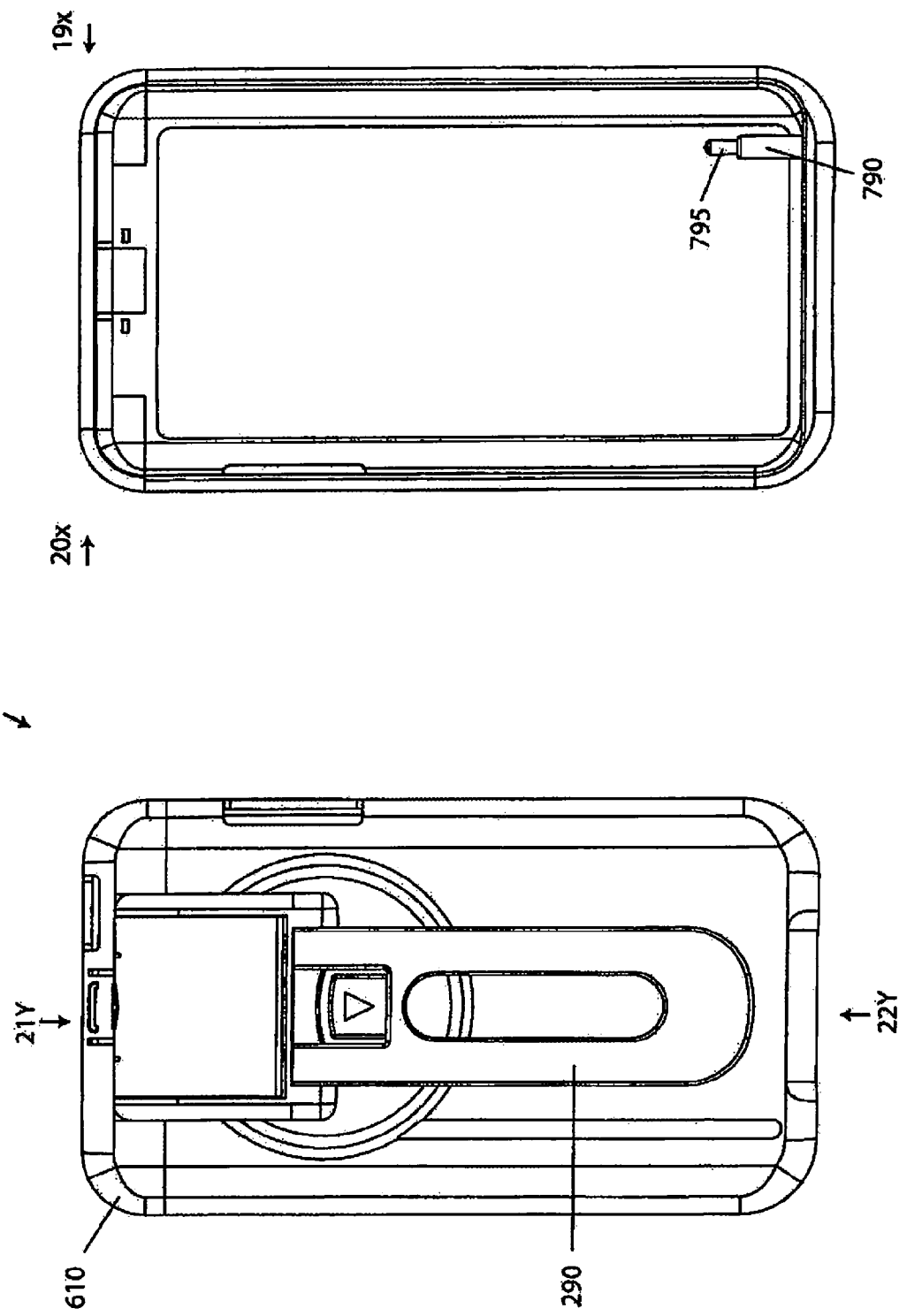

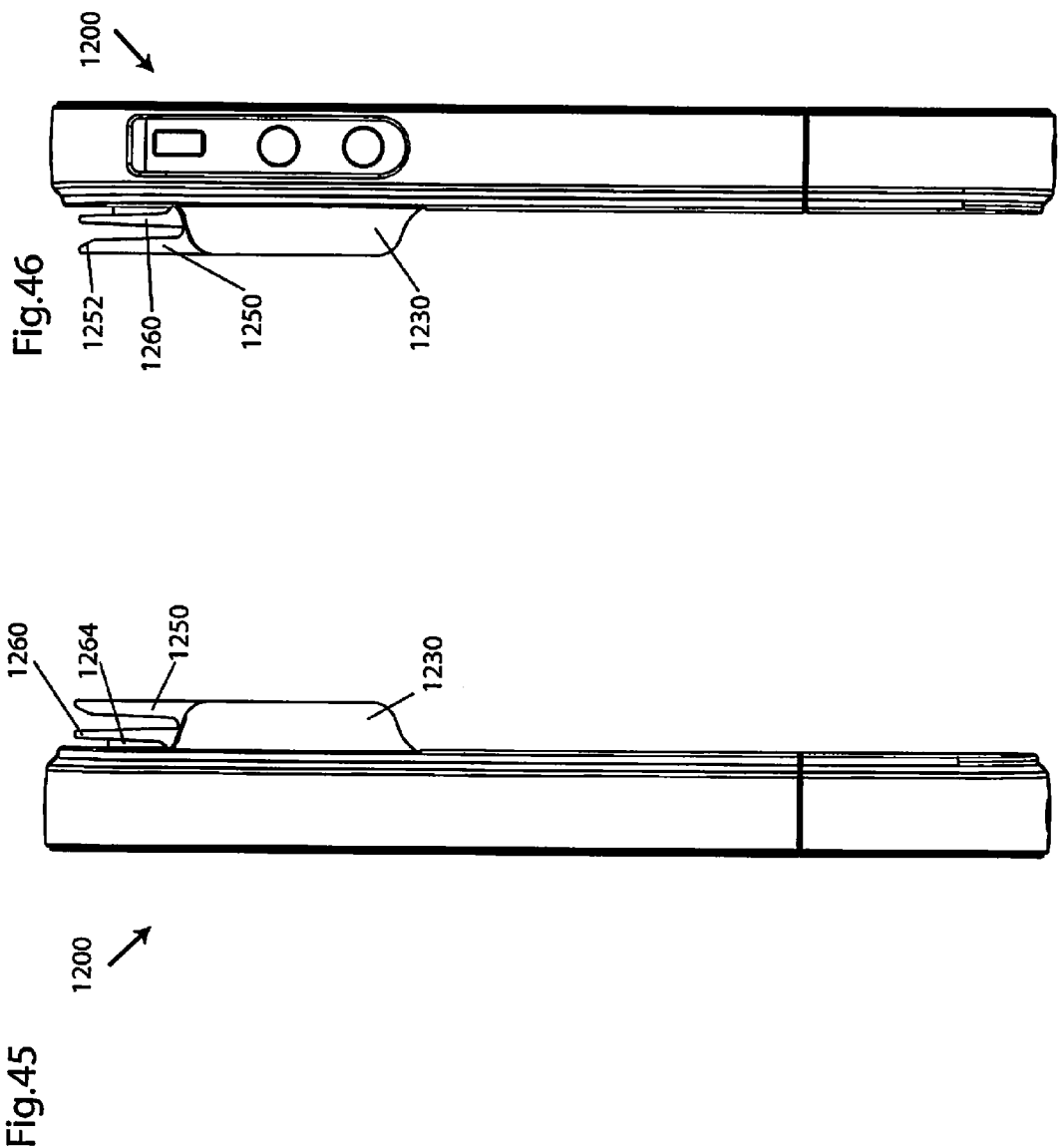

1200

1200

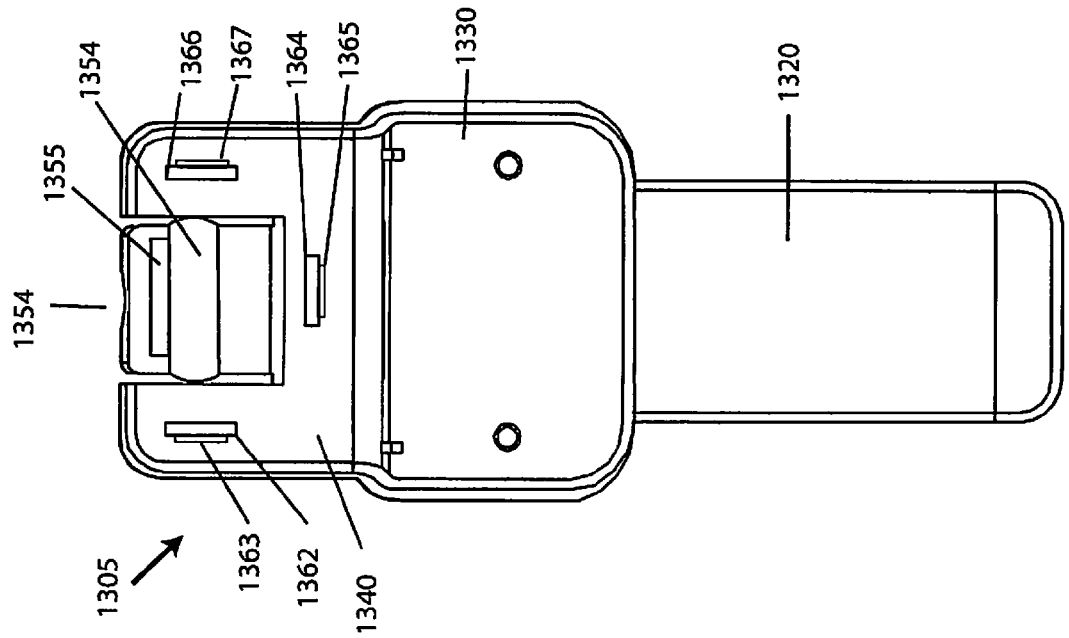
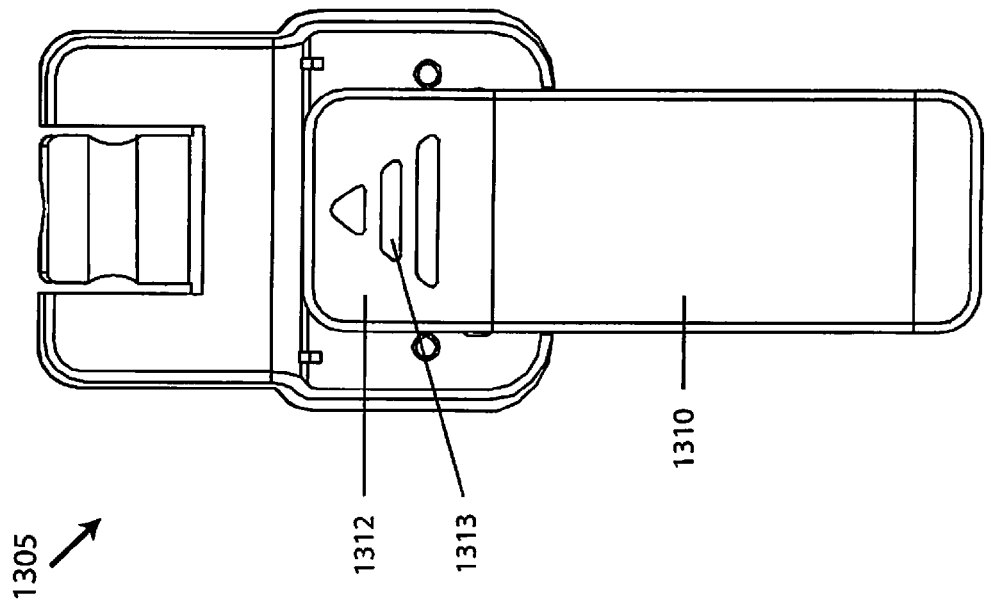

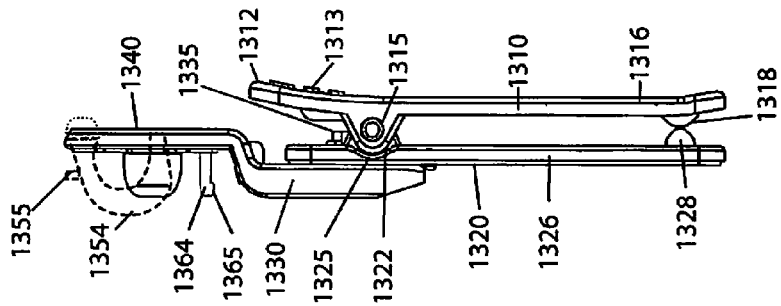
Fig.56
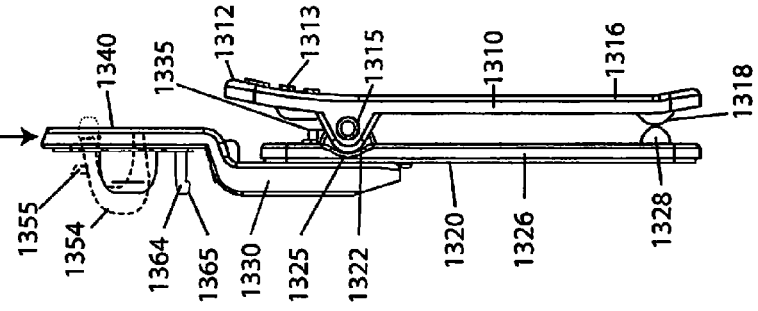
Fig.55
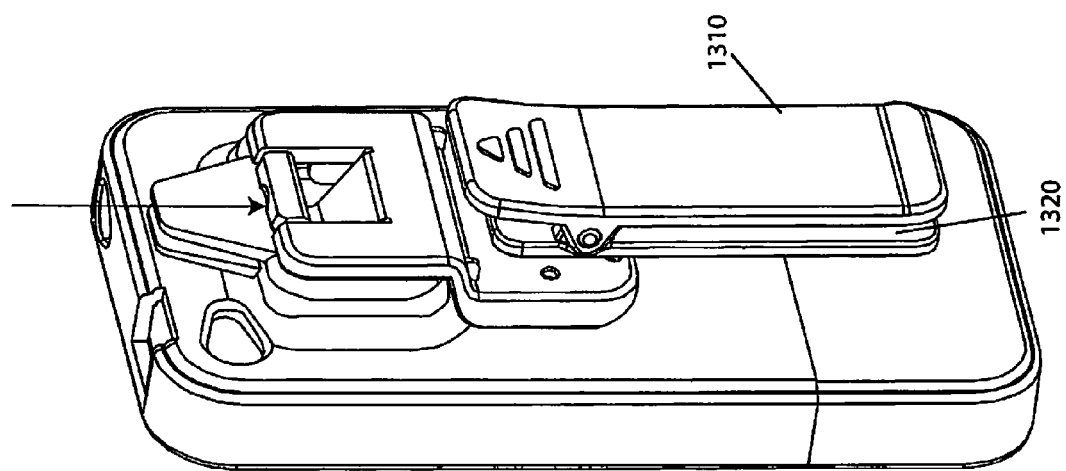

1400

CASES AND COVERS FOR ELECTRONIC HANDHELD DEVICES

This invention is a Continuation-In-Part of U.S. patent application Ser. No. 12/748,765 filed Mar. 29, 2010, now U.S. Pat. No. 8,485,404, and U.S. Design patent application Ser. No. 29/358,510 filed Mar. 29, 2010, now U.S. Pat. D654,068. The entire disclosure of each of the applications listed in this paragraph are incorporated herein by specific reference thereto.

FIELD OF INVENTION

This invention relates to cases, in particular to novel cases, covers, faceplates and backplates for protecting and holding portable handheld electronics, such as but not limited to portable devices for downloading and playing music, such as an IPOD®, portable digital electronic devices for sending and receiving phone calls such as an iPhone®, iPad™, Blackberry® phones, HTC® phones, cellular phones, mobile phones, mobile video players, MP3 players (MPEG standard for transmitting music over the world wide web), PDA (personal digital assistants), and the like, which have retractable earplug/headphone cords, and with other novel features such as bottle openers, and removable belt clips.

BACKGROUND AND PRIOR ART

Portable handheld electronics such as mobile phones, and the like, are subject to damage from being dropped or hit into. Damage can include the battery cases being accidentally opened, to the electronic device itself having to be replaced. Various sleeve devices have been used over the years, but these devices often cannot be used with all types of handheld electronic devices such as IPods® and iPhones® manufactured by Apple Computer.

Additionally, many portable electronics are used with headphones, such as earphones, and the like. However, the loose headphones with their cords makes these accessories often difficult to store when not being used. Merely wrapping the cord around the portable electronic device is undesirable, as well as unsightly, and can cause these parts to become damaged over time. Thus, the need exists for a way to protect headphones and their cords when not being used with the portable electronics devices.

U.S. Published Patent Applications: 2004/0204165 to Huang and 2005/0255898 to Huang each describe different types of cellular phone cases having some type of a retractable headphone. However, Huang '165 requires the housing be extra wide to allow the headset to be pulled in along one side of the cellular phone. In addition to creating substantially extra space that can defeat the purpose of having a small cellular phone, this patent requires the cord rewinder to be located at the bottom of the case, which can cause the cord to become tangled and stuck when retracting along the inner side of the case. Additionally, the outer end of the headpiece still remains outside of the case and is not fully protected when retracted, with the exposed end being a snag type hazard. Also, the hanging appearance the of head piece does not create an aesthetic appearance.

Huang '898 does not fix these problems and in fact has the head piece itself remains substantially outside the case when retracted where it can become damaged from its exposure since it is unprotected as well as being a snag hazard. Furthermore, Huang '898 requires a part of the cord to have to hang below the case, and requires the plug to be separately plugged in, which also increases potential damage to the stored phone as well as create another snag hazard. Additionally, the hanging appearance of the head piece and lower hanging cord do not create an aesthetic appearance. Thus, both Huang references teach and describe undesirable types of cases with retractable cords.

Still furthermore, most cases and covers for portable electronic devices such as for cellular type phones are limited to only protecting the electronic device itself. Often the user would need to separately carry beverage accessory devices such as but not limited to bottle cap openers when traveling. Placing a separate bottle cap opener in one's pocket is undesirable, and can easily be forgotten. Also, small devices such as bottle cap openers can be easily lost.

U.S. Pat. No. 7,494,239 to Riccardi issued February 2009 shows a "bottle opener" that can attach to the back of cell phones, where the bottle opener is angled out and can also be used as a belt clip. However, this clip substantially sticks outside and away from the case and would take up undesirable space and would not allow the case to be placed in a pocket such as the breast pocket for storage. Additionally, such as clip can easily snag onto the clothing or other items of the user and would not be desirable.

U.S. Published Patent Application 2006/0146483 to Patino describes a "battery door cover bottle opener" that serves as a cover for a battery and an audio output. However, the location of the opener can result in bottles causing damage to any exterior speaker on the electronics device. Also, the low location of the opener on the back of the housing would require the user having to grab the upper antenna end of the case to open the bottle, which can potentially damage both the antenna and the upper delicate electronics part of the electronics device that is being housed therein.

Thus, the need exists for solutions to the above problems with the prior art.

SUMMARY OF THE INVENTION

A primary objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, which have retractable earplug/headphone cords, with headphones that are stored out of sight when not used.

A secondary objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, which have retractable earplug/headphone cords, that do not become snag hazards when not used.

A third objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, with retractable cords and headpieces that are aesthetically clean in appearance when not being used since there are no remaining hanging parts.

A fourth objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, which have retractable headpieces and cords that safely protect the headpieces and cords from damage when not used.

A fifth objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, which have retractable headpieces and cords that do not require extra wide or deep storage cases that are substantially larger than the exterior dimensions of the portable electronics.

A sixth objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, which have retractable headpieces and cords where insertion of the portable electronics allows for direct connection to an interior prong that is connected to the retracted cord and headpiece.

A seventh objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, having built on accessories such as bottle openers, that do not substantially stick out from the electronics.

An eighth objective of the present invention is to provide cases, covers, faceplates and backplates for protecting and holding portable handheld electronics, such as but not limited to IPods®, iPhones®, iPads (portable handheld notepad computer with video and text messaging and emailing, for wireless transmissions), Blackberry® phones, HTC® phones cellular phones, mobile phones, mobile video players, MP3 players, PDA (personal digital assistants), having built on accessories such as bottle openers, that are not snag hazards.

A ninth objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, having built on accessories such as bottle openers, that would not potentially damage the portable electronics when the bottle opener is being used.

A tenth objective of the present invention is to provide cases, covers, faceplates and backplates for protecting and holding portable handheld electronics, such as portable devices for downloading and playing music, portable digital electronic devices for sending and receiving phone calls, such as an iPhone®, iPad™, Blackberry® phones, HTC® phones, cellular phones, mobile phones, mobile video players, MP3 players (MPEG standard for transmitting music over the world wide web), PDA (personal digital assistants), and the like, having built on accessories such as bottle openers, with detachable belt clips for allowing the cases, covers, faceplates and backplates to clip onto belts, pockets, and the like.

A preferred embodiment of the holder for handheld electronics can include a backplate having a support frame sleeve sized to fit substantially about perimeter edges of a portable handheld electronic device, a storage compartment having a lid that is attached to an upper surface portion of the backplate, and a cord and headpiece for being used with the portable handheld electronic device, the cord and headpiece being both capable of being stored inside of the compartment beneath under the lid of the compartment when not being used, and the headpiece and the cord being capable of being removed from the compartment when used with the portable handheld electronic device.

The lid can include a hinge edge for allowing the lid to open or close the compartment. The holder can include a cord winder attached to the backplate, the cord winder allowing both the cord and the headpiece to be fully retracted into the compartment under the lid.

The holder can include a plug attached to the cord, the plug located inside of the support frame sleeve so that sliding the portable electronic device into the backplate connects a socket in the portable electronic device to the cord and headset, and sliding the portable electronic device out of the support frame sleeve separates the cord from the socket of the portable electronics device.

The holder can include a bill (money) clip extending downward from the compartment for allowing the holder to be clipped onto a belt or pocket of a user.

The clip can include a depressible switch for allowing the clip to be detached from the compartment.

The holder can support and protect a portable electronics device being an iPhone®. The holder can support and protect a portable electronics device being an IPOD®, iPad™ (portable handheld notepad computer with video and text messaging and emailing, for wireless transmissions). The holder can support and protect a portable electronics device being a portable phone.

An accessory holder embodiment for handheld electronics, can include a backplate having a support frame sleeve sized to fit substantially about perimeter edges of a portable handheld electronic device, a slightly raised box attached to an upper surface portion of the backplate the box having a substantially planar outer face that is substantially parallel to a longitudinal axis of the backplate, and a bottle opener fixed in the planar outer face.

An embodiment of this invention is the ability to use specific components (components labeled 280, 270, and 300) of the case as a separate entity to act as a headphone or earpiece holder with the features of an enclosable case and the self-winding feature that retracts the cords associated with the headphone or earpiece.

The raised box has side edges which slope out from the backplate. The portable handheld electronic device can be an iPhone®. The portable handheld electronic device can be an IPOD®. The portable handheld electronic device can be a iPad™. The portable handheld electronic device can be a portable phone.

The bottle cap opener embodiments can have the bottle cap opener fixed on the outside of the case holder.

Another embodiment of the bottle cap opener holder can include a slit in the box and a tab having the bottle opener, wherein the tab is slidable in and out of the slit in the box. The slidable tab can include a handle for allowing the tab to slide in and out of the slot in the box.

The bottle cap holder can include a single upwardly raised tab attached to the box adaptable for lifting bottle caps and can tabs. The bottle cap holder can include a pair of upwardly raised parallel tabs attached to the box for lifting can tabs. Each one of the parallel tabs and/or the single tab version can have a generally triangular configuration.

Another embodiment can include a belt clip, and an adapter attaching and detaching the belt clip from an opening in the bottle cap opener. The belt clip can include a two members which are pivotally attached to one another to form clamp ends for attaching the holder to a belt or pocket, and the like.

The belt clip adapter can include a depressible molded switch having a first position where the belt clip is locked to the bottle cap opener, and a second position where the belt clip is detachable from the bottle cap opener. The adapter can include one or more, or at least a pair of downwardly extending prongs having lower ends which attach underneath edges of a rim about the opening to the bottle cap opener.

Another version of the belt clip adapter can include a depressible spring loaded switch having a first position where the belt clip is locked to the bottle cap opener, and a second position where the belt clip is detachable from the bottle cap opener. This other version can also use one or more hook ended prongs that can attach the belt clip adapter to the bottle cap opener case holder.

The belt clip adapter can include bendable disc halves for fitting into the opening of the bottle cap opener. Another version of the case holder can have a keyhole slot for allowing the disc halves to fit into and lock to the keyhole slot.

Further objects and advantages of this invention will be apparent from the following detailed description of the presently preferred embodiments which are illustrated schematically in the accompanying drawings.

BRIEF DESCRIPTION OF THE FIGURES

FIG. 5 is a front view of the combined front and backing plates of the holder of FIG. 3.

FIG. 6 is a rear view of the combined front plate and backing plate of FIG. 5.

FIG. 17 is a rear view of the holder of FIG. 16.

FIG. 18 is a front view of the holder of FIG. 17.

FIG. 45 is a left side view of the backing holder of FIG. 44.

FIG. 46 is a right side view of the backing holder of FIG. 44.

FIG. 53 is a planar view of the outer side of the belt clip adapter.

FIG. 54 is a planar view of the inner side of the belt clip adapter.

FIG. 55 is a left side view of the belt clip adapter of FIG. 53 with partial cut-away of the depressible button in a release position.

FIG. 56 is another left side view of the belt clip adapter of FIG. 53 with partial cut-away of the depressible button in an expanded lock position.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The inventions can be used with holding portable handheld electronics, such as portable devices for downloading and playing music (such an IPOD®), portable digital electronic devices for sending and receiving phone calls (such as an iPhone®), iPad™ (portable handheld notepad computer with video and text messaging and emailing, for wireless transmissions), cellular phones, mobile phones, mobile video players, MP3 players (MPEG standard for transmitting music over the world wide web, PDA (personal digital assistants), and the like. A list of components will now be described.

Figure 1:
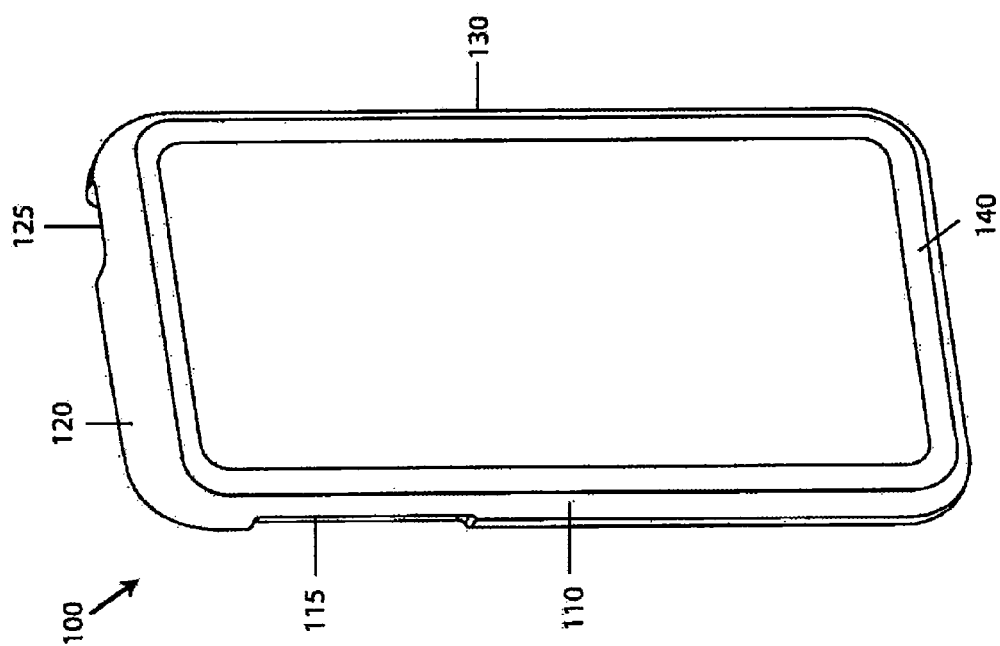
FIG. 1 is a perspective view of a front plate for the holder of the invention.

1. Holder of combined front plate and backing plate
100 Front plate
110 left side edge
115 upper slot
120 top side edge
125 hole for the on/off button
130 right side edge
140 bottom side edge
145 slot in bottom edge
147 on/off switch
148 wire line from dock connector to headphones
149 dock connector
190 downwardly protruding inside prong
195 male tip
200 Backing plate
210 right side edge
215 upper slot
220 top side edge
225 hole for the on/off button
230 left side edge
240 bottom edge
245 slot in bottom edge
250 lower half of backing plate
252 upwardly facing tab
254 raised protrusion
260 upper half of backing plate
262 downwardly facing tab
264 slot in tab
270/280 upper rear compartment and hinged door on backing plate
275 hinge prong slots for button clip hinge prongs 295
282 hinge side extending prongs
285 locking pins on top of lid
289 raised outer gripping surface 290 downwardly protruding bill clip
292 depressible button
293 protruding portion
294 slot in housing 300 for protruding portion 293
295 hinge side prongs of button
300 rewinder component housing
310 axle pin
320 rotatable wheel to hold cord
325 opening in wheel
330 metal coil (allows unit to extend out and retract)
340 ball bearing for the wheel to turn to extend and retract back
350 cord cover
360 inner back cover
400 cord
410 end attached to male prong
420 wrapped cord
450 end attached to headpiece
460 headpiece (earphone/headset)
500 portable handheld electronics device
510 female socket on electronics device
600 second embodiment
620 lower rear backing plate
610 upper snapable rear backing plate
790 upwardly protruding inside prong/jack
790A loose inside attached prong/jack
795 male tip
795A male tip
800 Another portable handheld electronics device
810 female socket on electronics device
900 Holder with bottle cap opener
910 snapable bottom of holder
915 slit in bottom of holder
920 top of holder
930 raised inwardly sloping side walls of partially raised upper box
932 reinforcement ribs
940 opening in face shaped to open bottle caps
950 tab to open bottle caps
1000 portable handheld electronics device
1100 Holder with sliding bottle cap opener
1110 housing for sliding bottle cap opener
1115 slot in top of housing
1117 elongated side slot in housing
1120 sliding bottle cap opener tab
1122 top edge of sliding opener tab
1124 side handle to enable sliding opener tab
1126 interior locking edges on sliding opener tab
1128 bottom edge of sliding opener tab
1129 strengthening ribs in slidable opener tab
1140 bottle cap opener in sliding tab
1150 top of holder
1152 camera opening in holder
1160 bottom of holder
1200 holder with double tabs
1210 top of holder case
1212 raised chamfered (beveled) edge
1220 bottom of holder case
1222 raised chamfered (beveled) edge
1230 raised inwardly sloping side walls of partially raised upper box
1232 reinforcement ribs
1238 protective cover
1240 opening in face shaped to open bottle caps
1250 upwardly outer raised tab
1252 angled outer edge
1260 upwardly raised inner tab
1264 support beam
1300 holder with snap on belt clip
1305 belt clip adapter
1310 pivotal clip member
1312 depressible end
1313 raised surface edges
1315 pivoting hinges
1316 outer pivotal grip end
1318 grip edge
1320 fixed bottom clip member
1322 attached end
1325 pivoting hinges
1326 outer grip end
1328 grip edge
1330 extended base for attachment to clip members
1335 biasing spring
1340 adapter base
1342 left leg
1344 middle connection
1346 right leg
1350 depressible U-shaped button
1352 raised button edge
1354 U-shaped member
1355 hook end on U-shape
1362 left prong
1363 hook end on left prong
1364 lower prong
1365 hook end on lower prong
1366 right prong
1367 hook end on right prong
1400 holder with spring locked belt clip
1405 rotatable belt clip adapter
1410 pivotal clip member
1412 depressible end (with raised gripping surface)
1415 pivoting hinges
1416 outer pivotal clamp end
1420 bottom fixed clip member
1422 attached end
1425 pivoting hinges
1426 outer clamp end
1430 bendable plastic disc halves
1440 belt clip holding piece (allows clip to rotate up to 90 degrees or more)
1445 U-shaped channel for disc halves
1446 downwardly extending protrusions
1448 lower facing female sockets
1450 clip base
1452 side cutouts for button
1455 through-holes for hooks
1458 upwardly facing male prongs
1460 spring clip buttons
1462 outwardly extending depressible button ends
1463 cavities for protrusions
1465 downwardly extending prongs
1466 hook ends on prongs
1468 inwardly extending tips for spring
1470 spring
1500 removable retractable headset and jack
1600 case holder with keyhole slot FIG. 1 is a perspective view of a front plate 100 for the holder 1 of the invention. The front plate 100 can include a left side edge 110, with upper longitudinal slot 115, top side edge 120 with hole 125 for the on/off button, right side edge 130 and bottom side edge 140.

Figure 2:
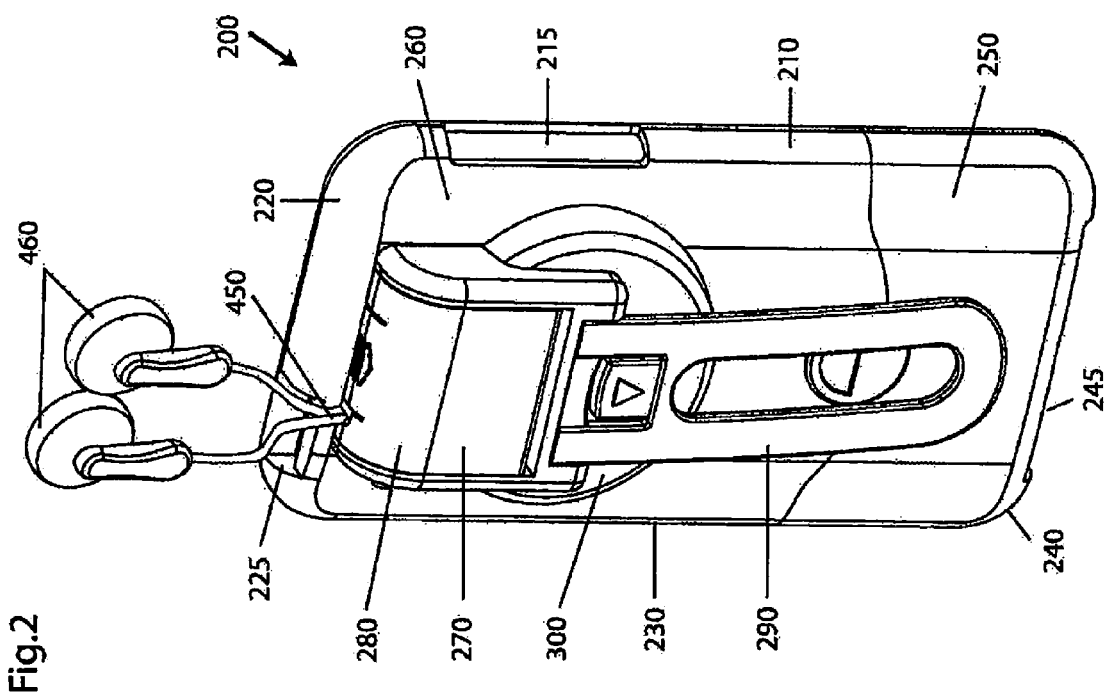
FIG. 2 is a perspective view of a backing plate for the holder of the invention attached to the front plate of FIG. 1.

FIG. 2 is a perspective view of a rear plate 200 with the front plate 100 attached thereto that combines into the holder 1 of the invention.

Figure 4:
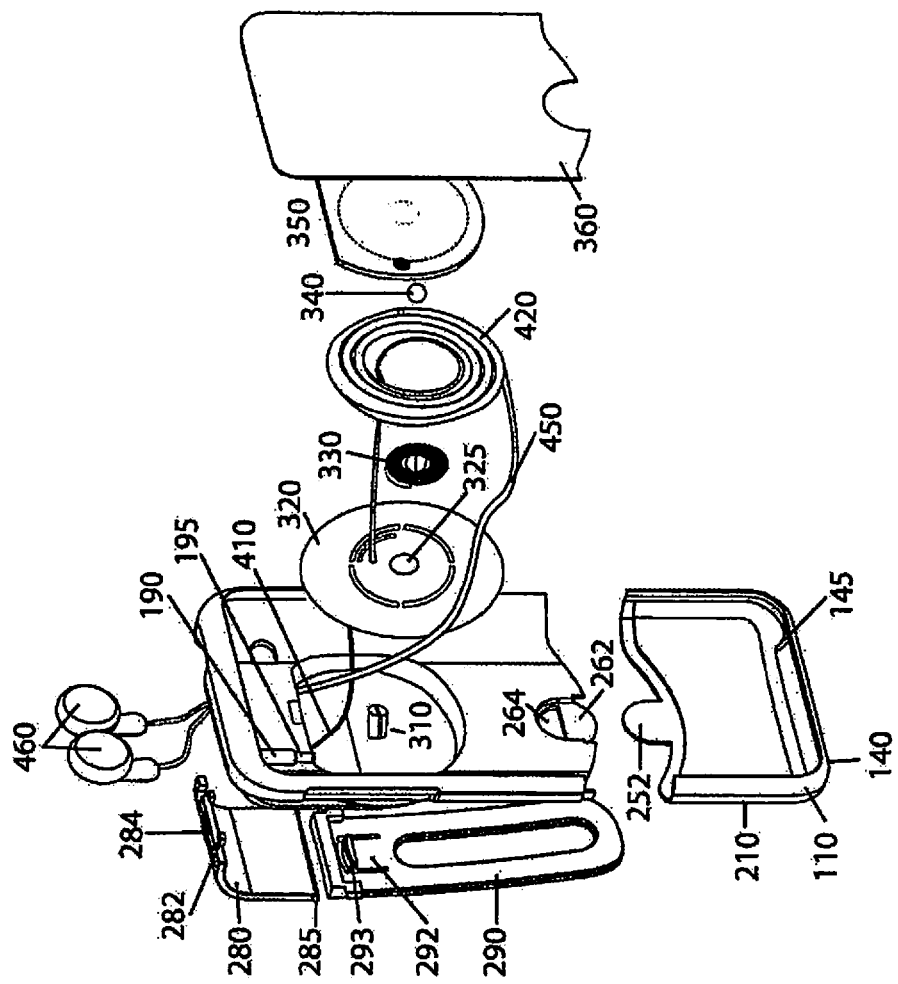
FIG. 4 is an exploded front view of the combined front plate and backing plate of the holder with rewinder, storage compartment lid and clip detached from the holder.
Figure 3:
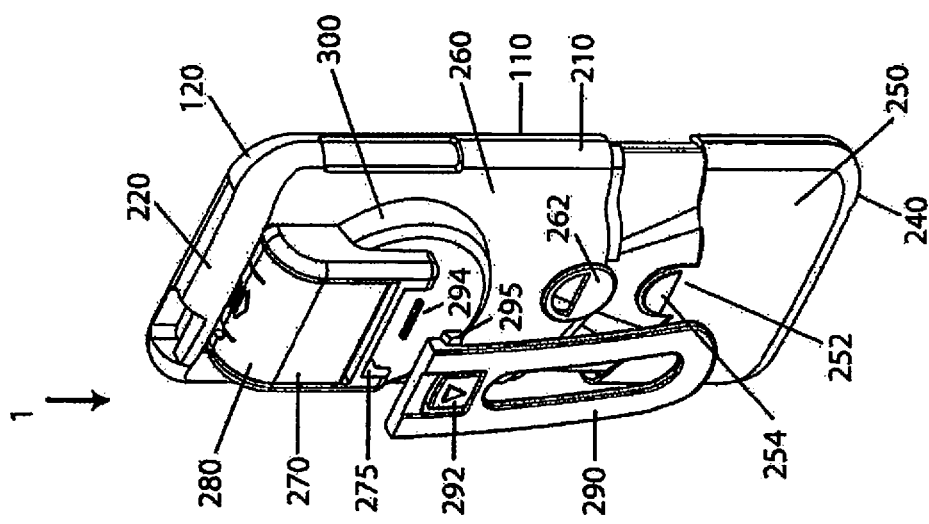
FIG. 3 is another perspective view of the backing plate of FIG. 2 with front plate of FIG. 1 with backing plate separated apart and rear clip detached from the backing plate.

FIG. 3 is another perspective view of the backing plate 200 of FIG. 2 with front plate 100 of FIG. 1 with backing plate 200 separated apart and rear clip 290 detached from backing plate 200. FIG. 4 is an exploded front view of the combined front plate 100 and backing plate 200 of the holder 1 with rewinder components 300-350, storage compartment lid 280 and clip 290 detached from the holder 1.

Figure 8:
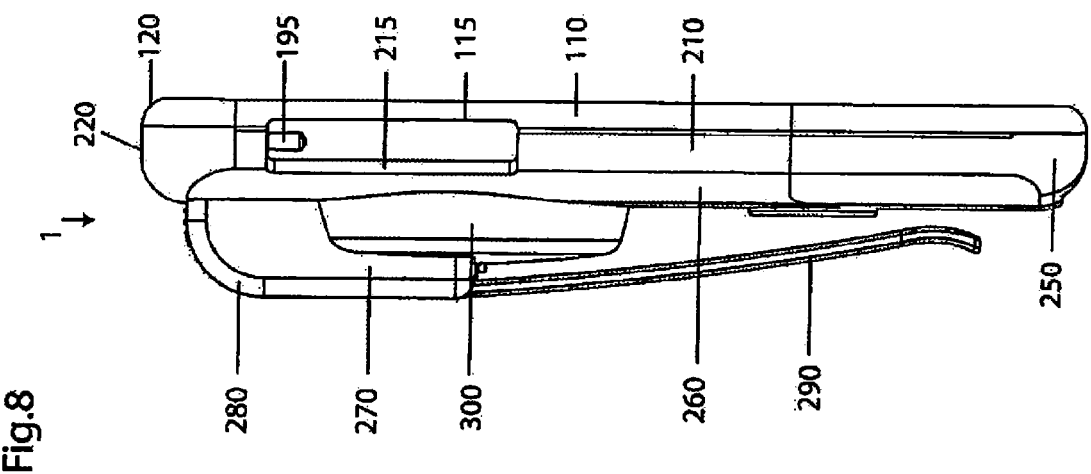
FIG. 8 is a left side view of the combined front and backing plates of FIG. 5 along arrow 8X.
Figure 7:
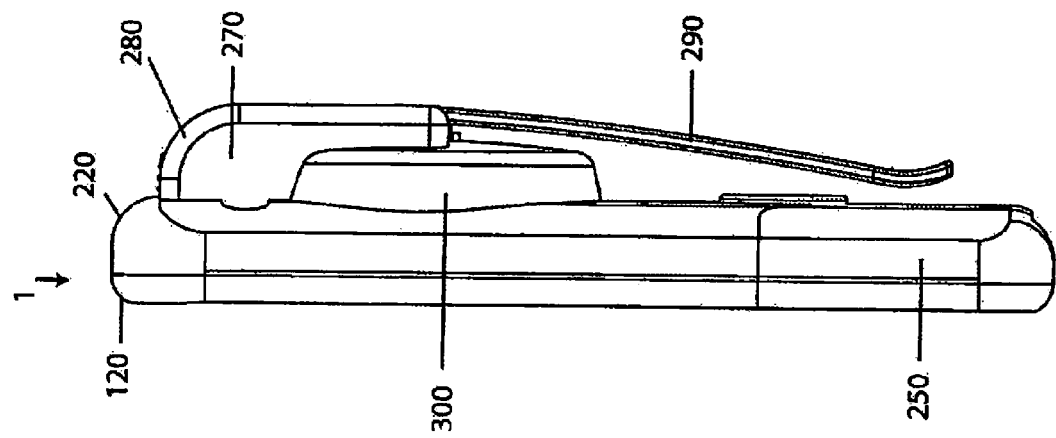
FIG. 7 is a right side view of the combined front and backing plates of FIG. 5 along arrow 7X.
Figure 9:
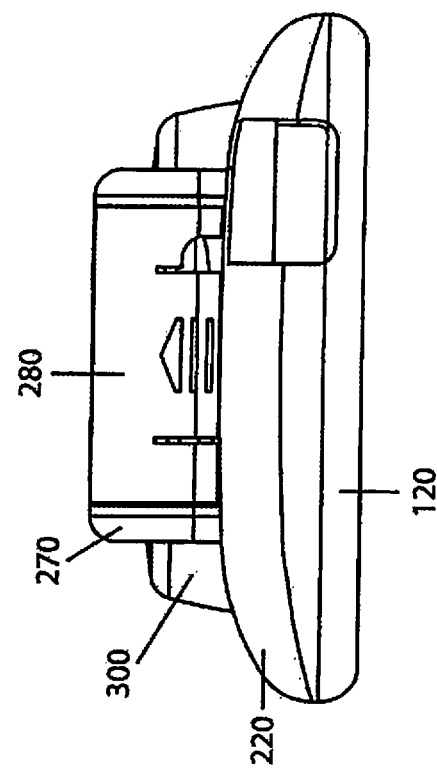
FIG. 9 is a top view of the combined front and backing plate of FIG. 6 along arrow 9Y.
Figure 10:
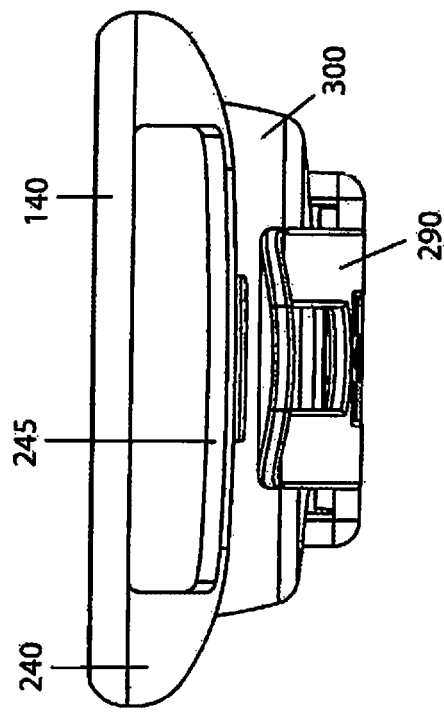
FIG. 10 is a bottom view of the combined front and backing plate of FIG. 6 along arrow 10Y.

FIG. 5 is a front view of the combined front 100 and backing plates 200 of the holder 1 of FIG. 3. FIG. 6 is a rear view of the combined front plate 100 and backing plate 200 of FIG. 5. FIG. 7 is a right side view of the combined front 100 and backing plates 200 of FIG. 5 along arrow 7X. FIG. 8 is a left side view of the combined front 100 and backing plates 200 of FIG. 5 along arrow 8X. FIG. 9 is a top view of the combined front 100 and backing plate 200 of FIG. 6 along arrow 9Y. FIG. 10 is a bottom view of the combined front 100 and backing plate 200 of FIG. 6 along arrow 10Y.

Referring to FIGS. 1-10, the holder 1 can be use to support portable handheld electronic devices, as described above. The backing plate 200 can be two parts that snap together. The backing plate 200 can include a lower half 250 with an upwardly facing tab 252 with raised protrusion 254 that can interlock with a slot 264 in downwardly facing tab 262 of the upper half 260 of the backing plate 200.

On the upper portion of the backing plate 200 can be a rear compartment 270 molded about a rewinder component housing 300. The one piece compartment lid 270/280 can have hinged side prongs 285 at a lower side and with a pair of locking pins that mateably attach to like holes to close the compartment 270. A raised outer gripping surface 289 allows a user's finger to open and close the lid 280 to the compartment 270.

Attached to the compartment 270 can be a removable bill (money) or belt type clip 290 that can be use do clip the holder 1 to belts, or pockets of the user. The bill type clip 290 can include a depressible button 292 with hinge side prongs 295 that fit into inner side edge slots 275 on the lower part of the container 270. The other side of the button 292 has a protruding portion 293 that can fit into a slot 294 on the outside of the rewinder housing 300, wherein depressing the button 292 toward the holder 1 can allow the clip 290 to drop from and be separated from the holder 1.

A rewinder component housing 300 can be attached to an upper portion of the backing plate 200 beneath the lid 280 of the compartment. The rewinder housing 300 can be sized to fit within a lower part of the compartment 280. Inside the rewinder housing 300 which can be generally cylindrical can be an axle pin 310 that supports a rotatable wheel 320 with opening 325 that fits over the axle pin 310. The wheel 320 can have raised surfaces that supports a metal coil 330 and a ball bearing 340 and cover 350 and inner wall cover 360 that supports a wound cord 420 thereon. Such rewinder components can be similar to those found in U.S. Patent Application Publication 2004/0204165 to Huang, which is incorporated by reference. The user can pull on the exposed cord 450 which activate the spring loaded rewinder which can retract the entire cord end 450 and entire headpiece 460 into the compartment 270.

The wound cord 420 can have an end 450 attached to a headpiece 460, such as but not limited to an earphone, two earphones, a small headset, headphones with small microphone (so user can answer calls) and the like. Additionally, the headphones can be wireless headphones that can be stored inside the compartment. The opposite end 410 of the wound cord 420 can be attached to an inwardly protruding prong 190 on the under side of front plate 100 with a male tip 195, the significance which will be described later.

Figure 11:
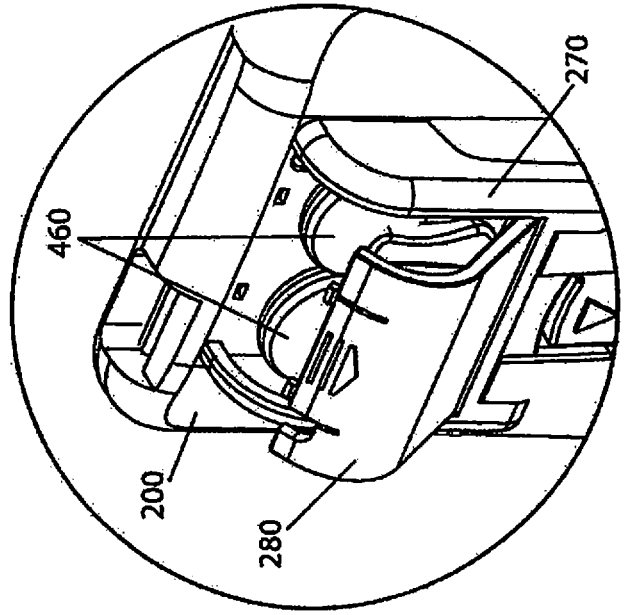
FIG. 11 is an upper enlarged view of the storage compartment on the back plate of the holder of FIGS. 1 and 6 with the compartment lid in an open position with both the headpiece and cords stored inside the compartment.

FIG. 11 is an upper enlarged view of the storage compartment 270 on the back plate 200 of the holder of FIGS. 1 and 6 with the compartment lid 280 in an open position with both the headpiece 460 and cords (underneath headpiece) stored inside the compartment 270. As shown, the lid 280 can easily close the compartment 270 and store the entire headpiece 460 and cords inside when the headpiece is not being used.

Figure 12:
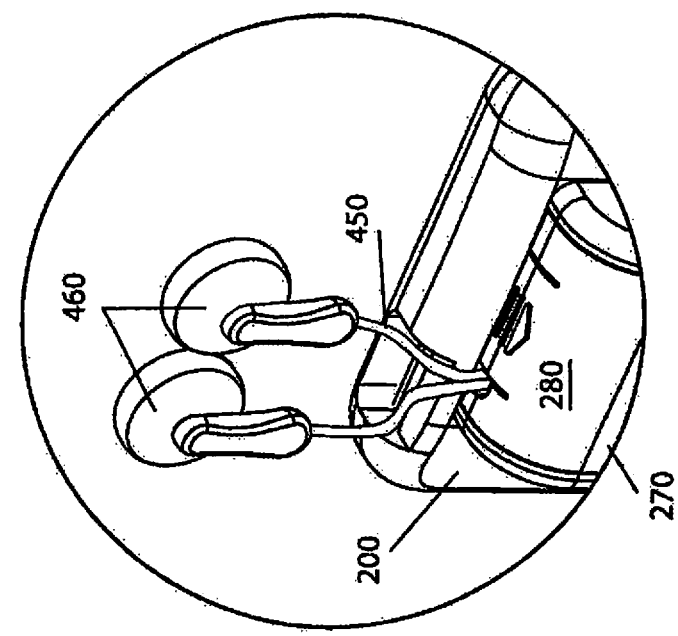
FIG. 12 is another enlarged view of the storage compartment of FIG. 11 with the lid closed and the headpiece pulled outside of the compartment when being used.

FIG. 12 is another enlarged view of the storage compartment 270 of FIG. 11 with the lid 280 closed and the headpiece 460 pulled outside of the compartment 270 when being used. Here, the lid 280 can be in a closed position, and the headpiece pulled to an extended position to be used by the user.

Figure 13:
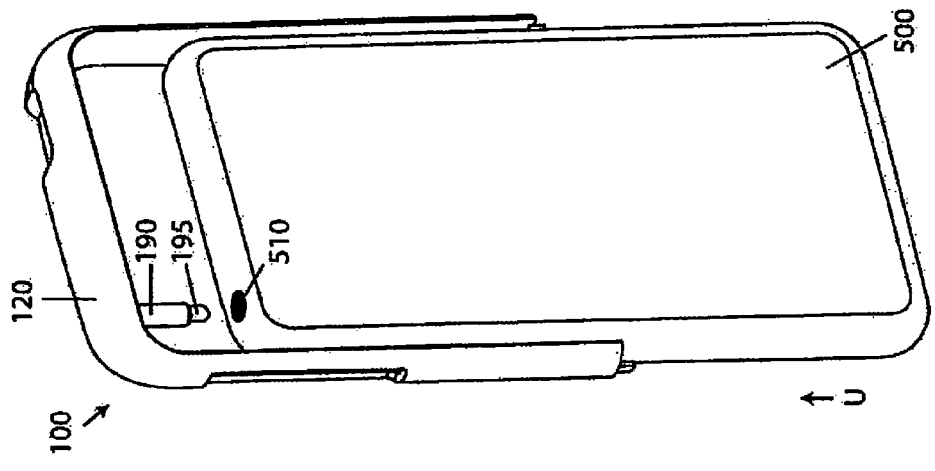
FIG. 13 shows the holder front frame separated from the backplate with the inwardly protruding cord attached male prong about to be inserted into a female socket of a portable handheld electronics device.

FIG. 13 shows the holder front plate separated from the backplate with the inwardly protruding cord attached male prong 190, 195 about to be inserted into a female socket 510 of a portable handheld electronics device 500.

Figure 14:
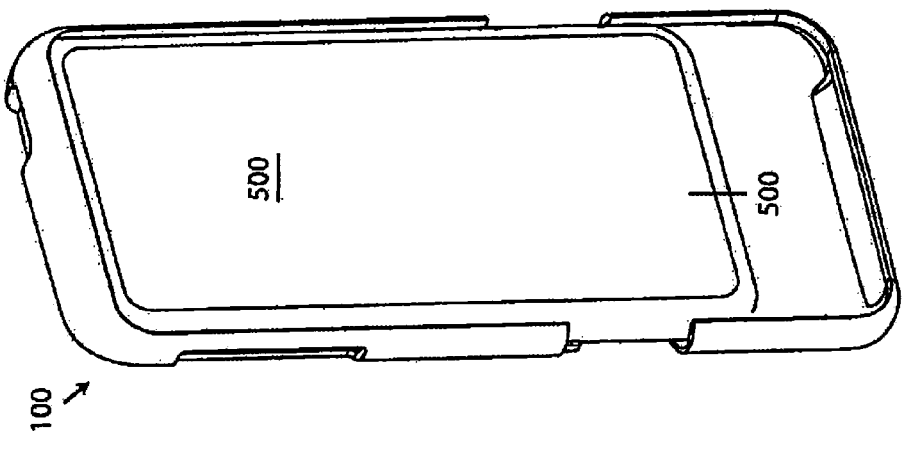
FIG. 14 is another view of the portable handheld electronics device of FIG. 13 slid into the upper part of the holder front frame with the male prong now inserted into the female socket on the top of the portable handheld electronics device.

FIG. 14 is another view of the portable handheld electronics device 500 of FIG. 13 slid into the upper part of the holder front plate 100 with the male prong 190, 195 now inserted into the female socket 510 on the top of the portable handheld electronics device 500. Referring to FIGS. 4, 8, 13 and 14, a portable handheld electronics device 500, such as an iPhone®, and the like, can be slid upward in the direction of arrow U so that the upper female socket 510 can wrap about the downwardly projecting male prongs 190, 195 that are mounted in the inner top of the front plate 100 of the holder. Moving in the opposite direction, the portable handheld electronics device 500 can be separated and detached from the holder 1.

Figure 4A:
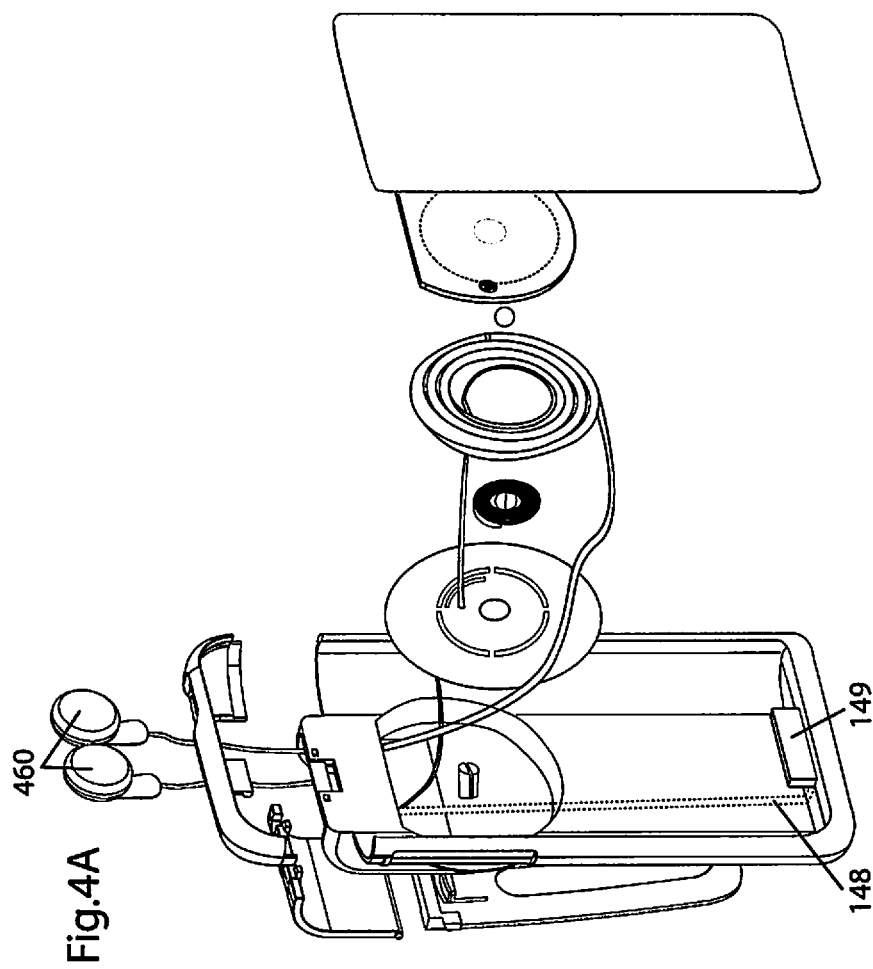
FIG. 4A is another exploded view of the combined front plate and backing plate of FIG. 3A with the dock connector.
Figure 3A:
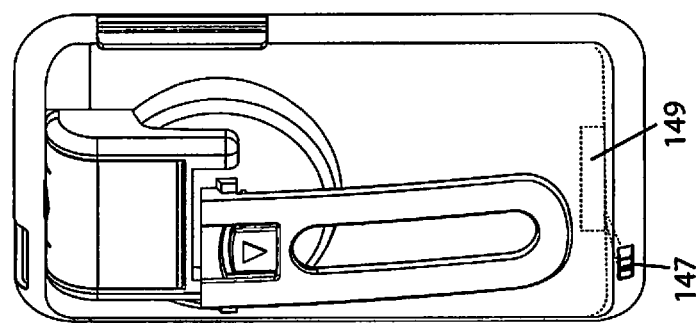
FIG. 3A is another perspective view of the backing plate of FIG. 3 with a switch for turning on and off a dock connector.

FIG. 3A is another perspective view of the backing plate of FIG. 3 with a switch 147 for turning on and off a dock connector 149. FIG. 4A is another exploded view of the combined front plate and backing plate of FIG. 3A with the dock connector 149 connected by line 148 to headphones 460.

Referring to FIGS. 3A, and 4A, the slot 145 (shown in FIG. 4) can be removed and a dock connector 149 can be used. The dock connector 149 can be a 30-pin connector such as the one described and shown in U.S. Patent Application Publication 2008/0102685 to Weiss et al., which is incorporated by reference.

Figure 16:
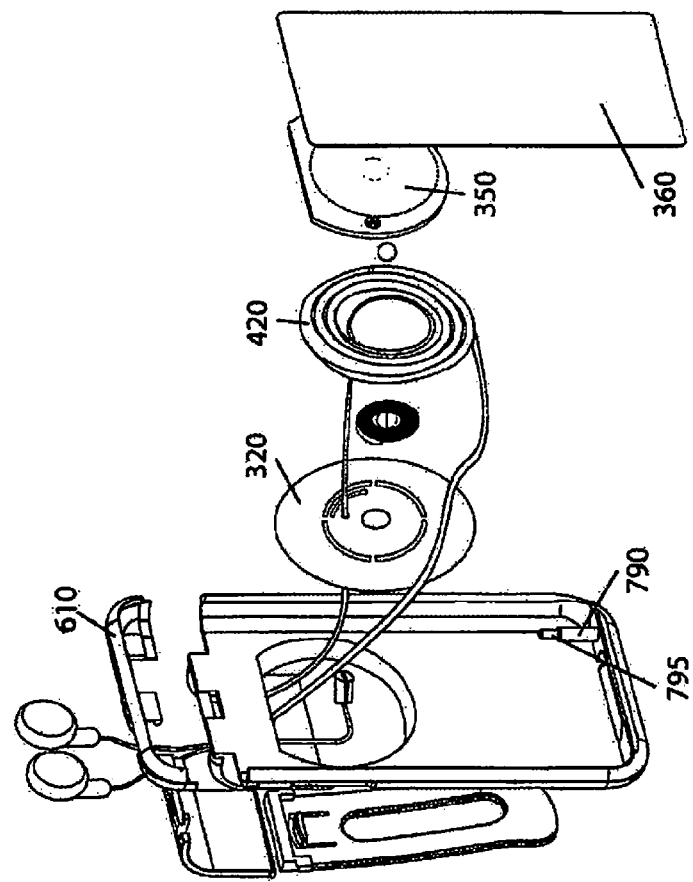
FIG. 16 is an exploded front view of the backing plate of the holder of FIG. 15 with rewinder, storage compartment lid and clip detached from the holder.
Figure 15:
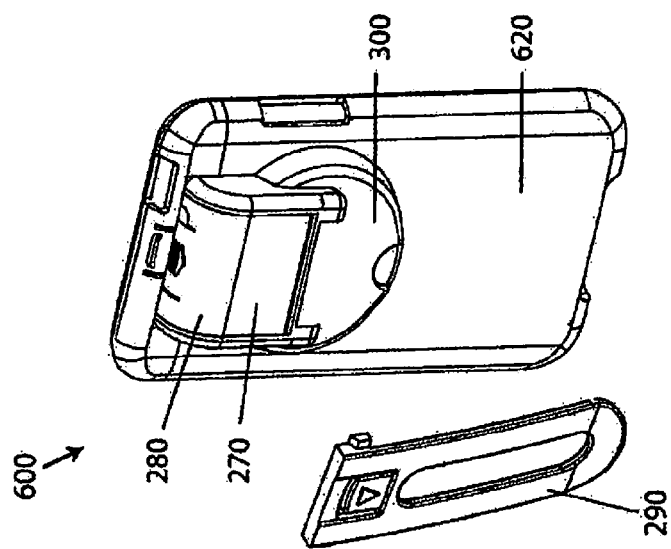
FIG. 15 is a perspective view of another embodiment of the holder showing a backing plate with rear clip detached from the backing plate.
Figure 20:
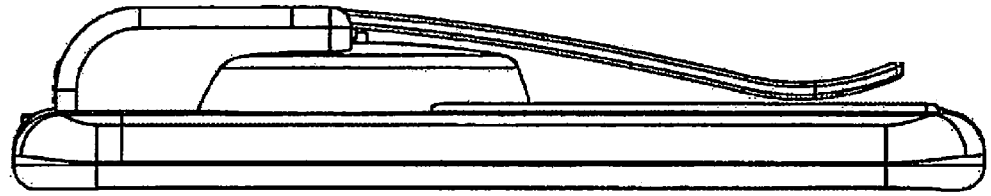
FIG. 20 is a left side view of the holder of FIG. 18.
Figure 19:
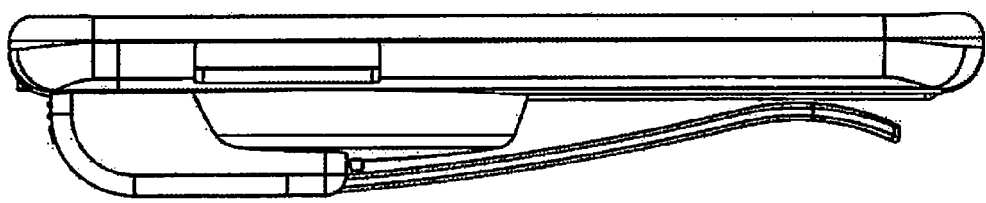
FIG. 19 is a right side view of the holder of FIG. 18.
Figure 22:
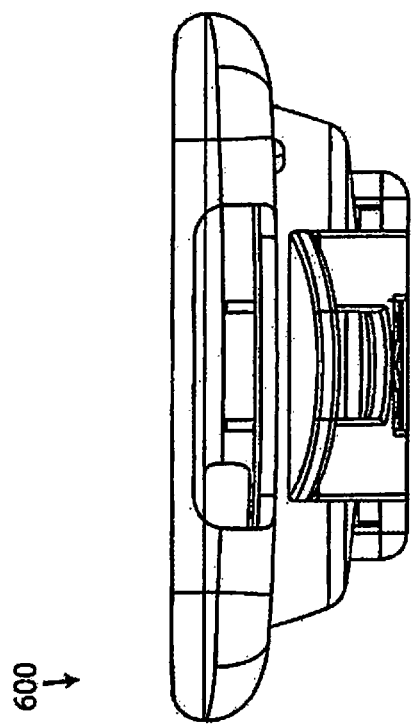
FIG. 22 is a bottom side view of the holder of FIG. 17.
Figure 21:
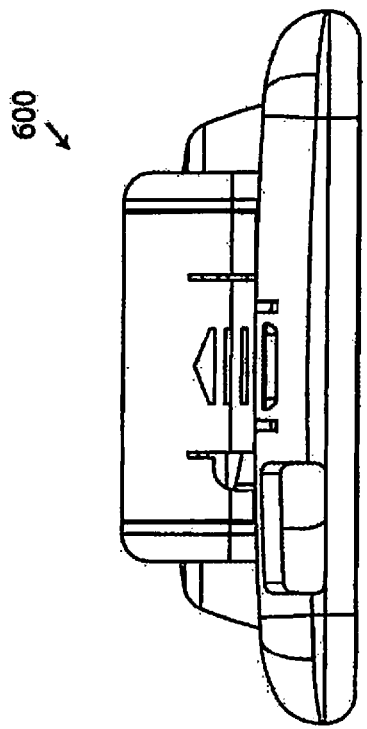
FIG. 21 is a top side view of the holder of FIG. 17.
Figure 24:
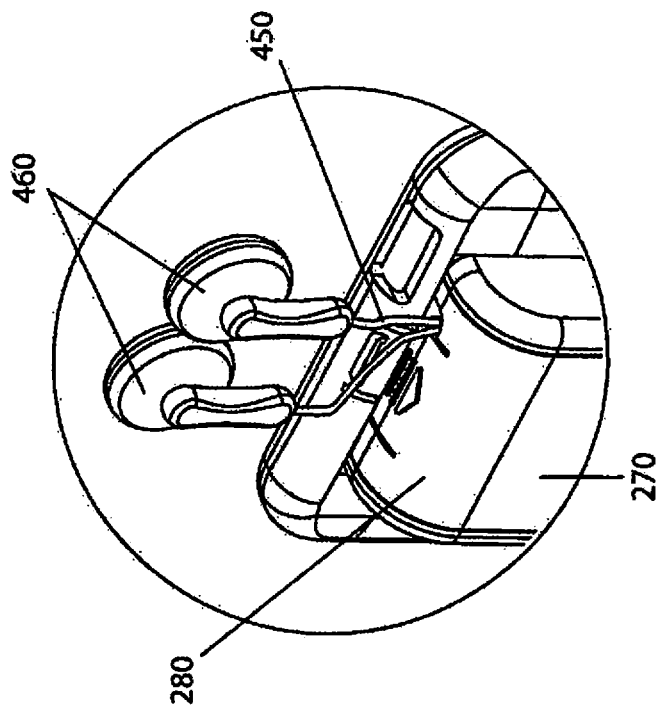
FIG. 24 is another enlarged view of the compartment of FIG. 23 with the lid closed and only the headpiece with cord end extending out from the compartment.
Figure 23:
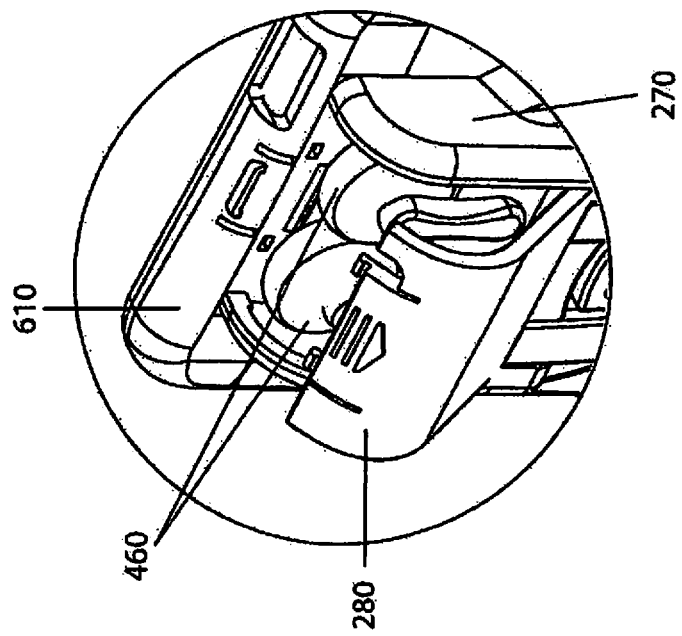
FIG. 23 is an upper enlarged view of the compartment in an open position with cord and headpiece fully inserted inside.

FIG. 15 is a perspective view of another embodiment of the holder 600 showing a backing plate 610, 620 with rear clip 290 detached from the backing plate 610, 620. FIG. 16 is an exploded front view of the backing plate 610, 620 of the holder 600 of FIG. 15 with rewinder components 300-360, storage compartment lid 280 and clip 290 detached from the holder 600. FIG. 17 is a rear view of the holder 600 of FIG. 16. FIG. 18 is a front view of the holder 600 of FIG. 17. FIG. 19 is a right side view of the holder 600 of FIG. 18. FIG. 20 is a left side view of the holder 600 of FIG. 18. FIG. 21 is a top side view of the holder 600 of FIG. 17. FIG. 22 is a bottom side view of the holder 600 of FIG. 17. FIG. 23 is an upper enlarged view of the compartment 270 in an open position with cord and headpiece 460 fully inserted inside. FIG. 24 is another enlarged view of the compartment of FIG. 23 with the lid 280 closed and only the headpiece 460 with cord end 450 extending out from the compartment.

Referring to FIGS. 15-24, the second embodiment can be used with other types of portable handheld electronics devices, such as but not limited to iPhones®, iPads®, and the like. This holder 600 can have similar components to that of the previous embodiment 1 with the exception that the holder 600 can be single backing plate 600 with perimeter side edges which can wrap about a portable handheld electronics device. The backing plate can have an upper snapable rear backing plate 610 that can snap about and attach to a lower backing plate. The other components can be similar to those described and shown in the embodiment of preceding FIGS. 1-14.

Another difference here is the inner prong is an upwardly protruding prong (jack) 790 with male tip 795 that is on the inner surface of the bottom of the holder 600. This is the headpieces connecting jack that can attach to an earphone port on an electronics device (such as a phone).

Figure 16A:
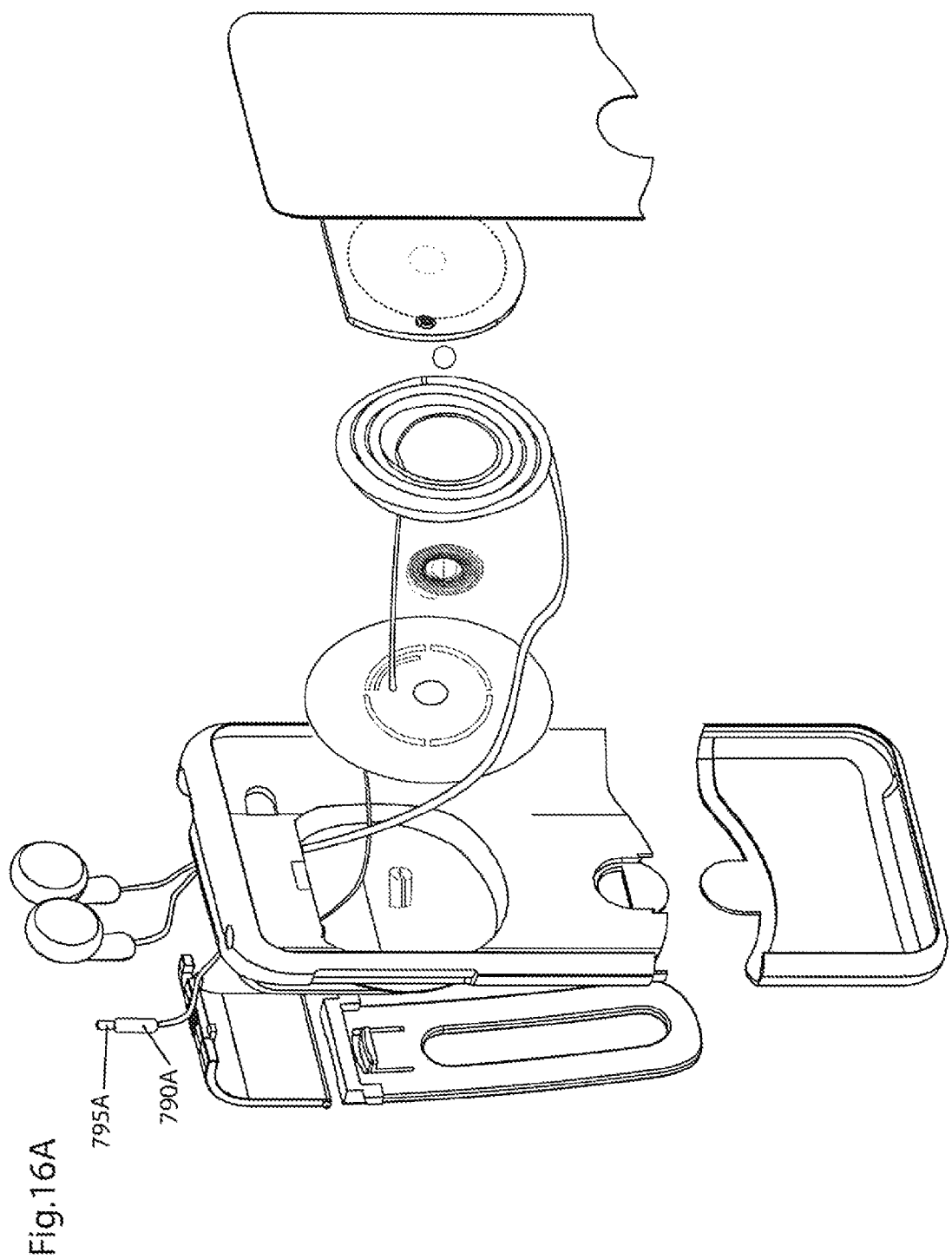
FIG. 16A is an exploded front view of the backing plate of the holder of FIG. 15 with a loose jack that is not part of the case.
Figure 24A:
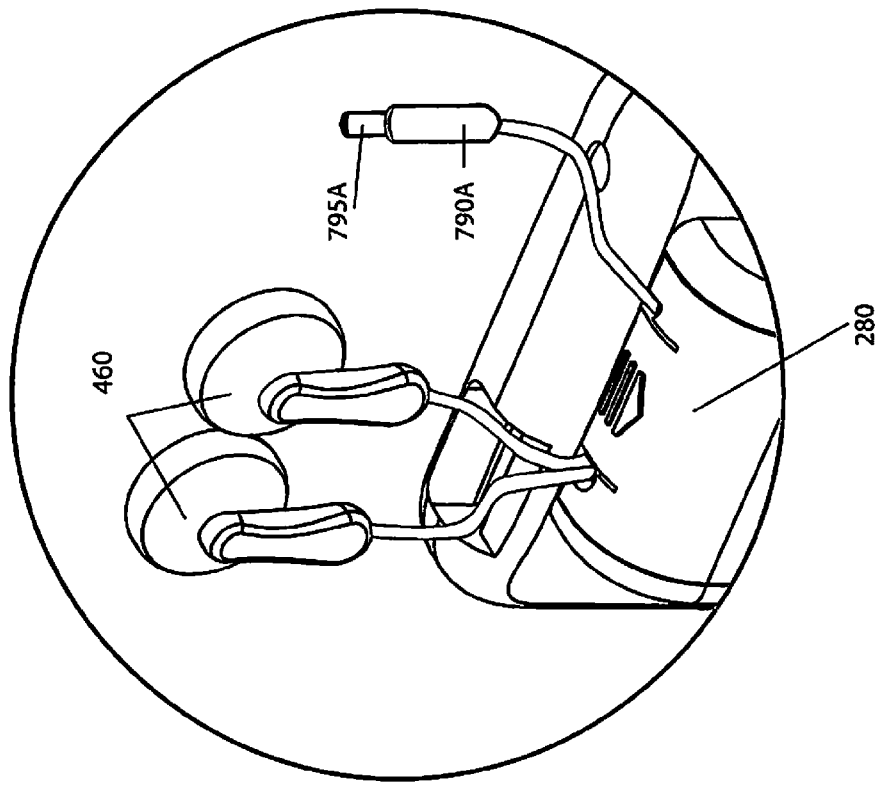
FIG. 24A is another enlarged view of the compartment of FIG. 23A with the lid closed and both the headpiece with cord end and loose jacket extending out of the compartment.
Figure 23A:
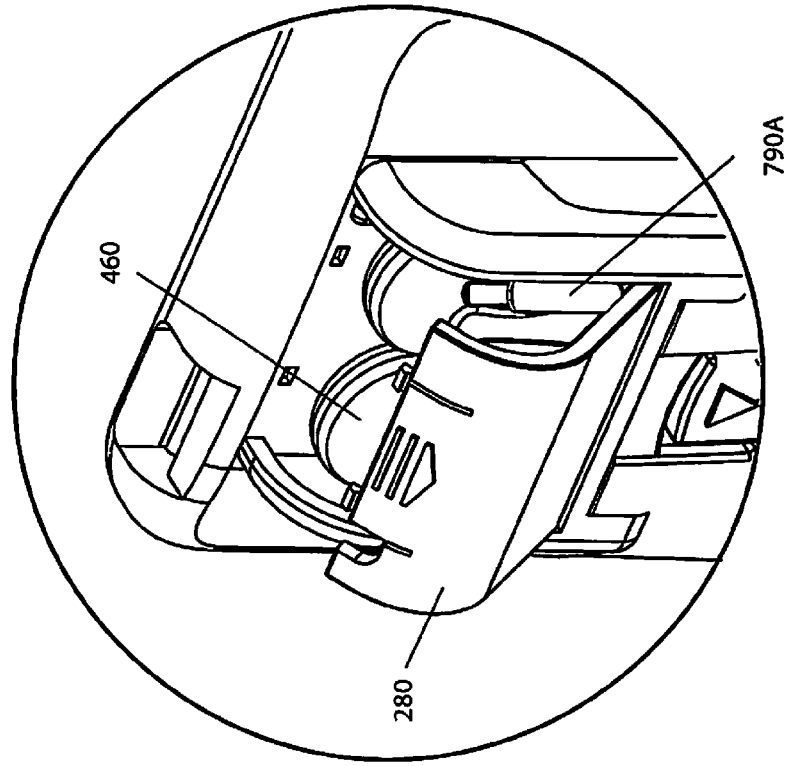
FIG. 23A is another upper enlarged view of the compartment in an open position of FIG. 23 with the loose jack (of FIG. 16A).

FIG. 16A is an exploded front view of the backing plate of the holder of FIG. 15 with a loose jack (male prong) 790A with male tip 795 with that is not part of the case holder 600. Unlike FIG. 16, the jack 790 is not attached to an extends upward from the bottom of the inner surface of the case holder 600. FIG. 23A is another upper enlarged view of the compartment in an open position of FIG. 23 with the loose jack 790A (of FIG. 16A). FIG. 24A is another enlarged view of the compartment of FIG. 23A with the lid 280 closed and both the headpiece 460 with cord end and loose jack 790A extending out of the compartment.

Figure 26:
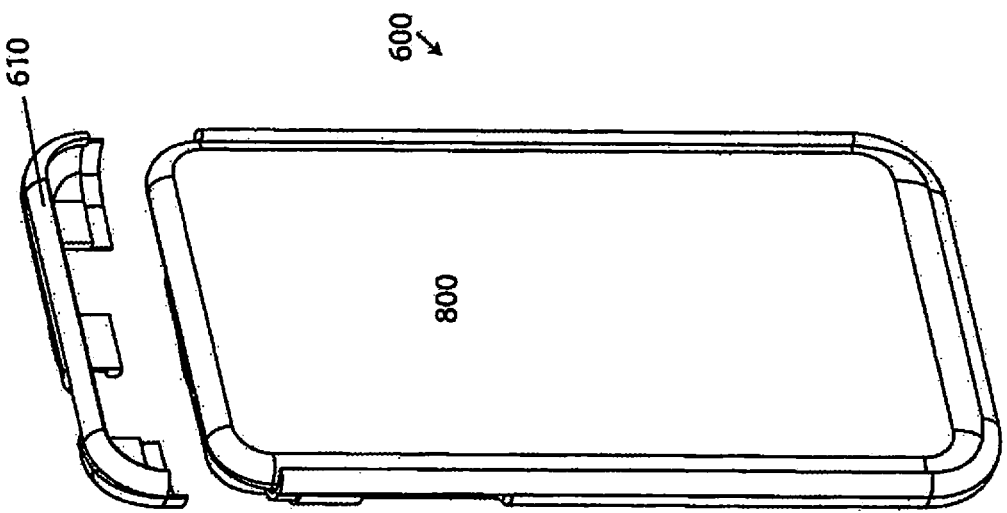
FIG. 26 shows the portable handheld electronics device slid into place in the front plate of the holder so that the male prong for the headpiece is connected to the electronics device.
Figure 25:
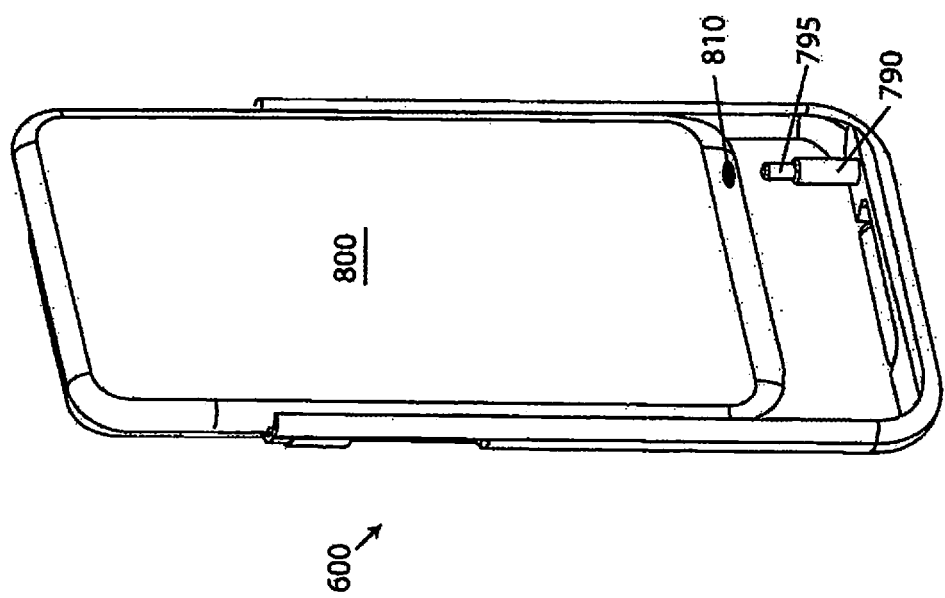
FIG. 25 shows the holder frame where the portable electronics device is about to be slid into the holder so that the female socket on the portable handheld electronics device can wrap about the upwardly protruding male prong on the front plate.

FIG. 25 shows the holder frame where the portable electronics device 800 is about to be slid into the holder 600 so that the female socket 810 on the portable handheld electronics device 800 can wrap about the upwardly protruding male prong 790, 795 on the bottom of the holder 600. FIG. 26 shows the portable handheld electronics device 800 slid into place into the holder 600 so that the male prong 790, 795 for the headpiece 460 is connected to the electronics device 800. The upper snapable backing plate part 610 can then lock the portable handheld electronics device 800 into the protective holder.

While the invention has been described as storing retractable cords with headpieces, the invention can be used for just storing headpieces, such as wireless headphones, when needed, or just storing headphones without the use of the retractable cord features. Also, the invention can be used to fully store and protect earphones and headphones having separate pluggable cords.

Figure 28:
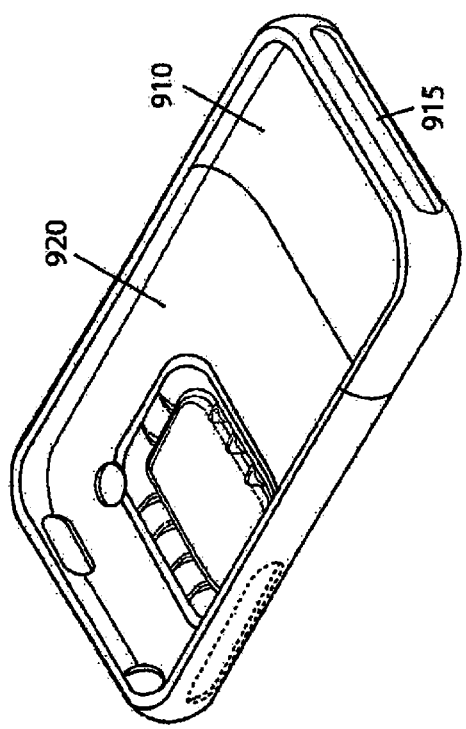
FIG. 28 is an interior perspective view of the backing holder of FIG. 27.
Figure 27:
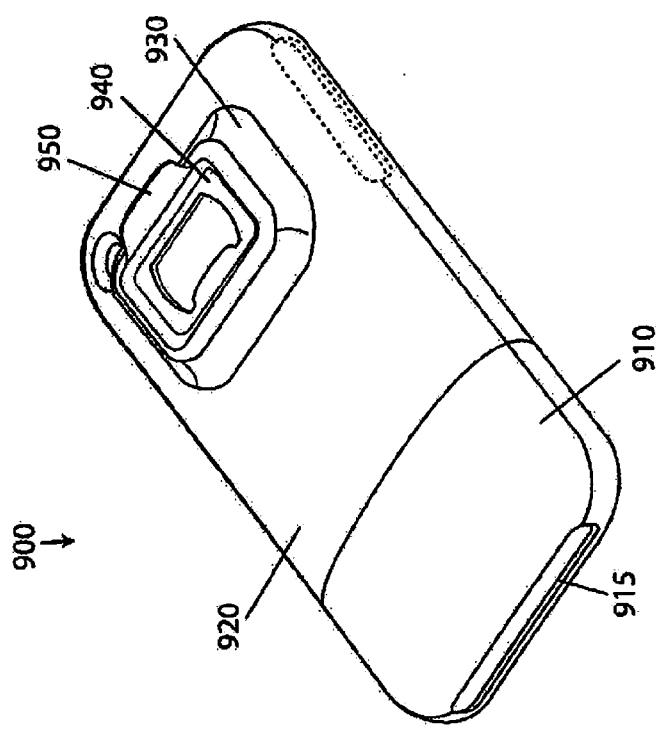
FIG. 27 is another embodiment showing a perspective view of a backing holder for a portable handheld electronics device with a built in bottle opener.
Figure 30:
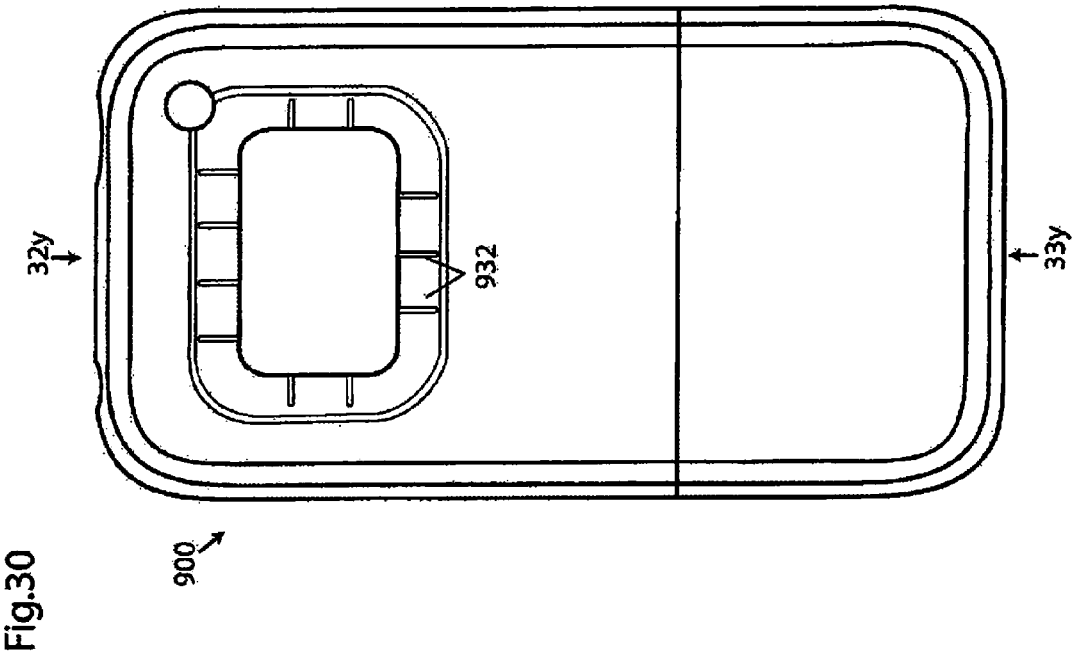
FIG. 30 is a planar view of the inside of the backing holder of FIG. 28.
Figure 29:
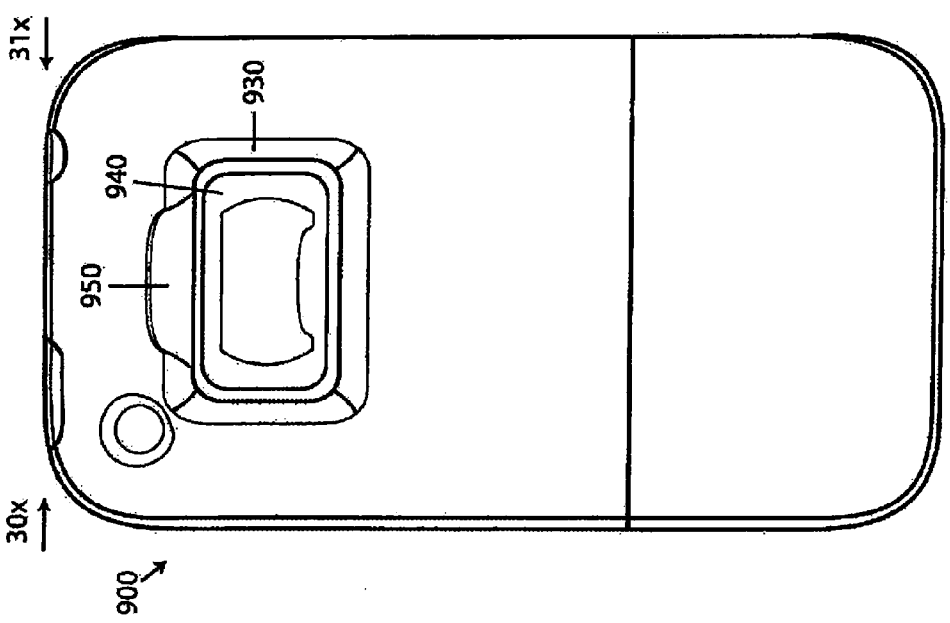
FIG. 29 is a planar view of the backing holder of FIG. 27.
Figure 32:
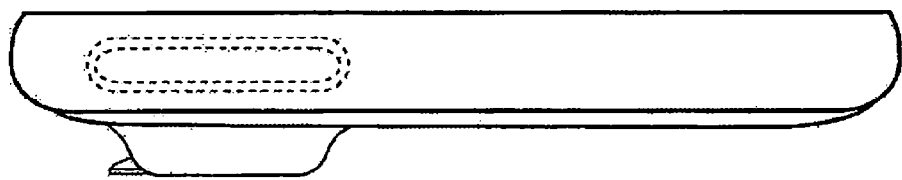
FIG. 32 is a left side view of the holder of FIG. 29 along arrow 32X.
Figure 31:
FIG. 31 is a right side view of the holder of FIG. 29 along arrow 31X.
Figure 33:
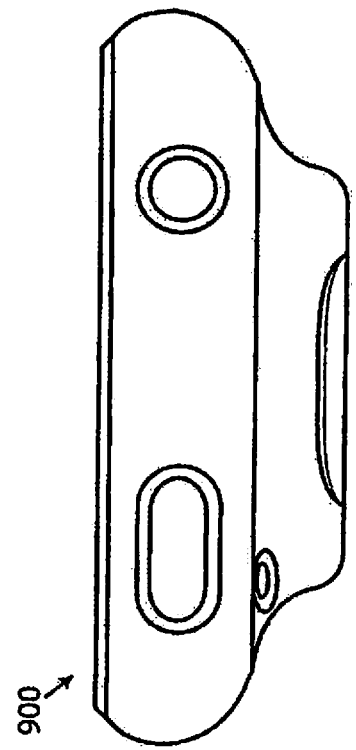
FIG. 33 is a top side view of the holder of FIG. 30 along arrow 32Y.
Figure 36:
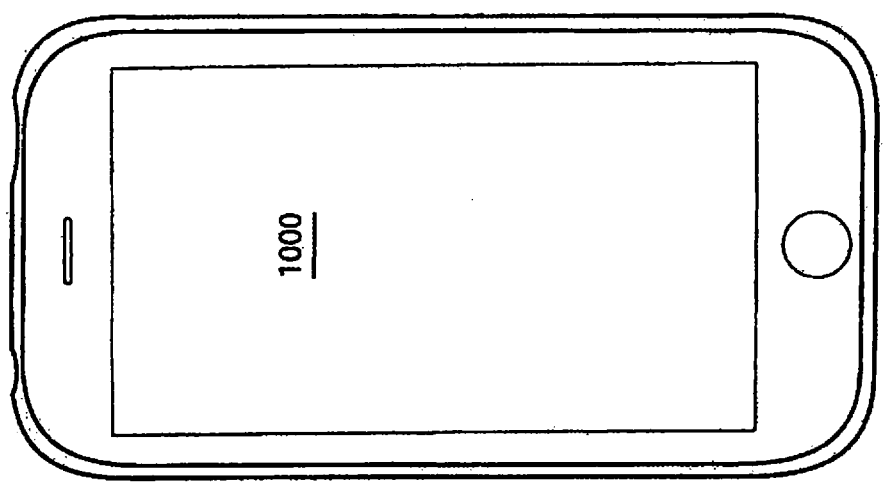
FIG. 36 shows the holder attached to the portable handheld electronics device of FIG. 35.

FIG. 27 is another embodiment showing a perspective view of a backing holder 900 for a portable handheld electronics device (shown as 1000 in FIGS. 34-35) with a built in bottle cap opener 930, 940, 950. FIG. 28 is an interior perspective view of the backing holder 900 of FIG. 27. FIG. 29 is a planar view of the backing holder 900 of FIG. 27. FIG. 30 is a planar view of the inside of the backing holder 900 of FIG. 28. FIG. 31 is a right side view of the holder 900 of FIG. 29 along arrow 31X. FIG. 32 is a left side view of the holder 900 of FIG. 29 along arrow 32X. FIG. 32 is a top side view of the holder 900 of FIG. 30 along arrow 32Y. FIG. 33 is a bottom side view of the holder 900 of FIG. 30 along arrow 33Y.

Referring to FIGS. 27-33, the holder 900 can be in two parts 910, 920 that snap together with side edges that wrap about perimeter edges of a portable handheld electronics device such as but not limited to a mobile phone, and the like. A bottom slit 915 in the bottom of the holder 900 allows for an easier fit about the portable handheld electronics device. The upper part of the holder can include a slightly raised box portion having inwardly sloping side walls 930 that form a planar type face with an opening 940 formed from metal, hardened plastic, and the like, that can be sized to open bottle caps on sodas, beer bottles, and the like. An additional raised tab 950 can also be used to open soda, beer, drink cans as well when needed. The inwardly sloped walls 930 can have reinforcement ribs 932 to better support the bottle cap opener face 940. The reinforcement ribs 932 are engineered to displace pressure that is generated when the opener is being used to open bottle caps, so that the electronics device and/or the actual case holder are not broken.

Figure 34:
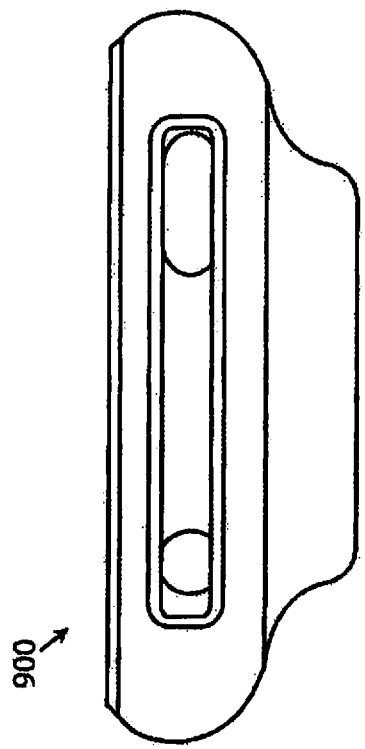
FIG. 34 is a bottom side view of the holder of FIG. 30 along arrow 33Y.
Figure 35:
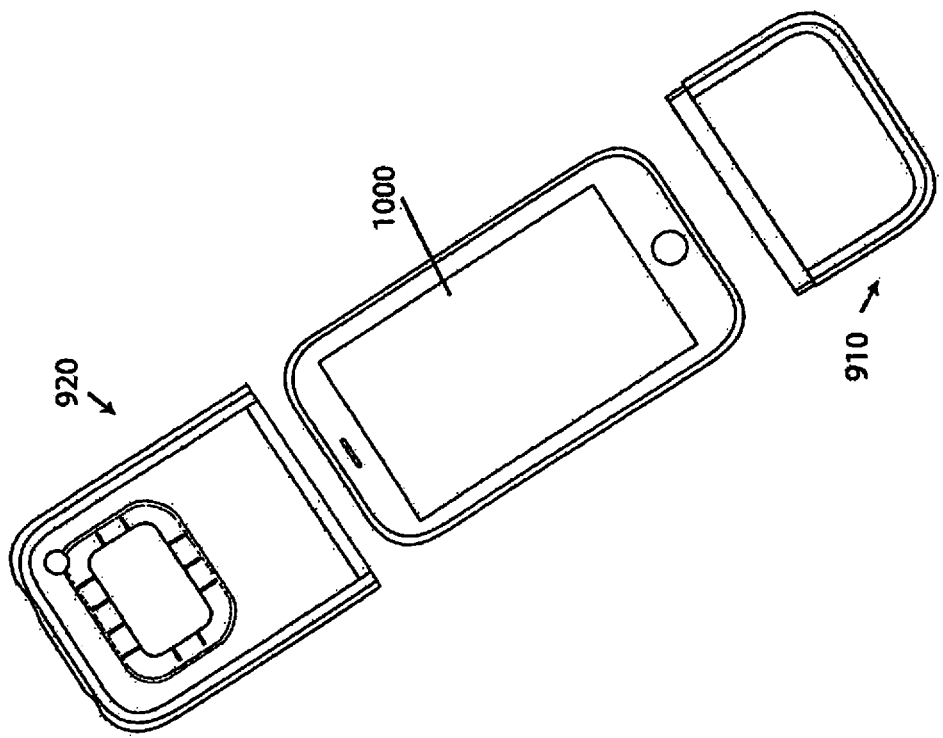
FIG. 35 is an exploded view of the holder about to slid about a portable handheld electronics device.

FIG. 34 is an exploded view of the upper and lower parts 910, 920 of the holder 900 about to slid about a portable handheld electronics device 100. FIG. 35 shows the holder 900 where the parts 910, 920 are snapped together to be attached to the portable handheld electronics device of FIG. 34.

An embodiment of this invention is the ability to use specific components (components labeled 280, 270, and 300) of the case as a separate entity to act as a headphone or earpiece holder with the features of an enclosable case and the self-winding feature that retracts the cords associated with the headphone or earpiece.

Although the invention describes the embodiments of a storage compartment on the holder separate from the bottle opener embodiment, the invention can be practiced where the storage compartment and bottle opener accessory are on the same backing plate, with one on top of the other.

Figure 38:
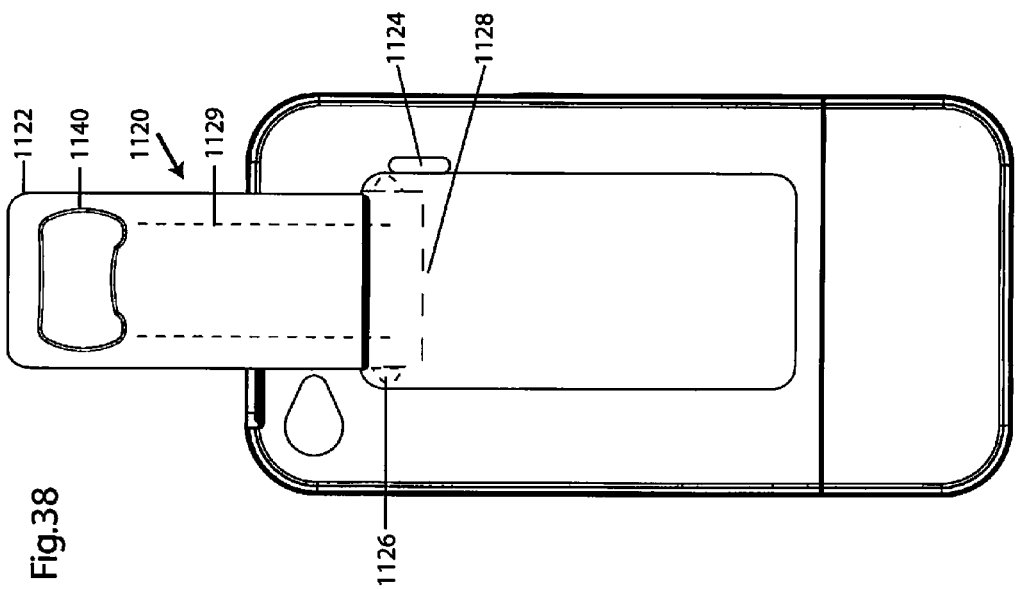
FIG. 38 is another view of the backing holder of FIG. 37 with the slidable bottle opener tab in an extended position.
Figure 37:
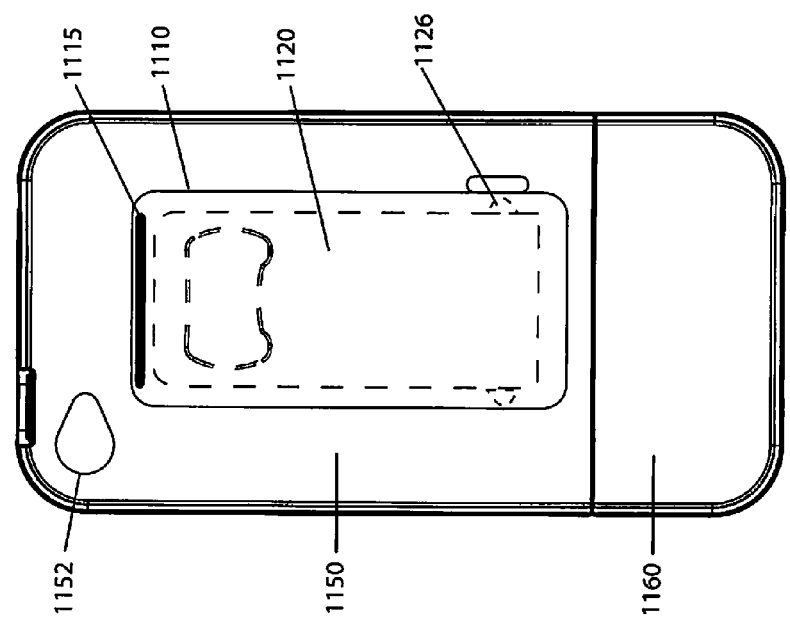
FIG. 37 is a planar view of another embodiment showing the backing holder with a slidable bottle opener tab in a retracted position.
Figure 40:
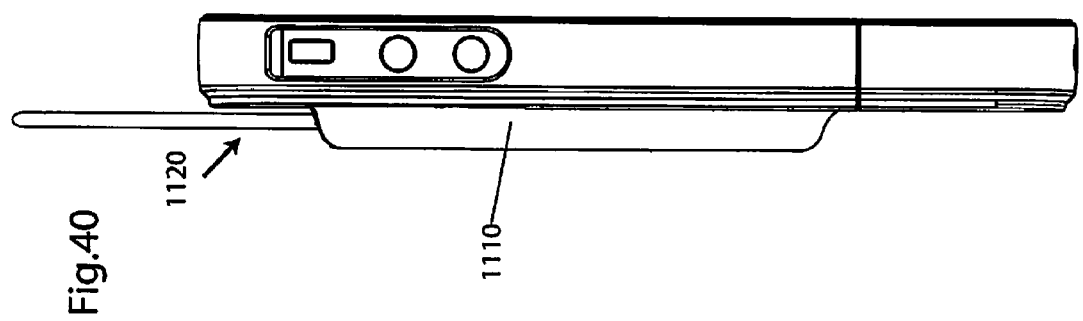
FIG. 40 is a left side view of the holder of FIG. 38 with the extended slidable bottle opener tab.
Figure 39:
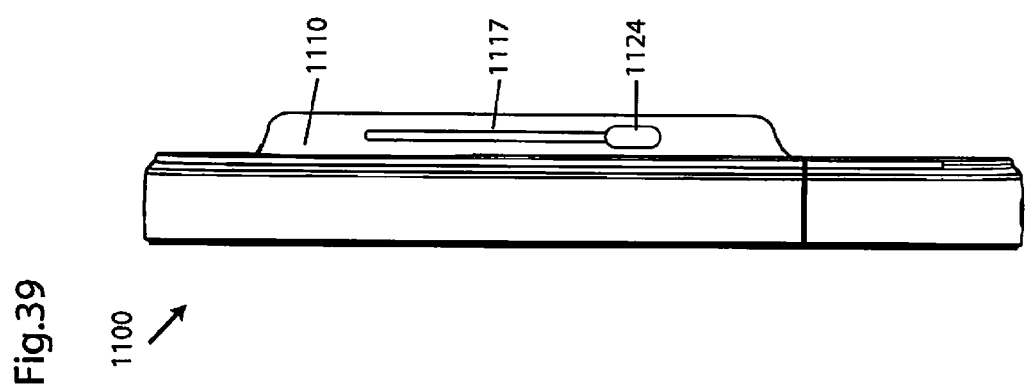
FIG. 39 is a left side view of the holder of FIG. 37 with the retracted slidable bottle opener tab.
Figure 42:
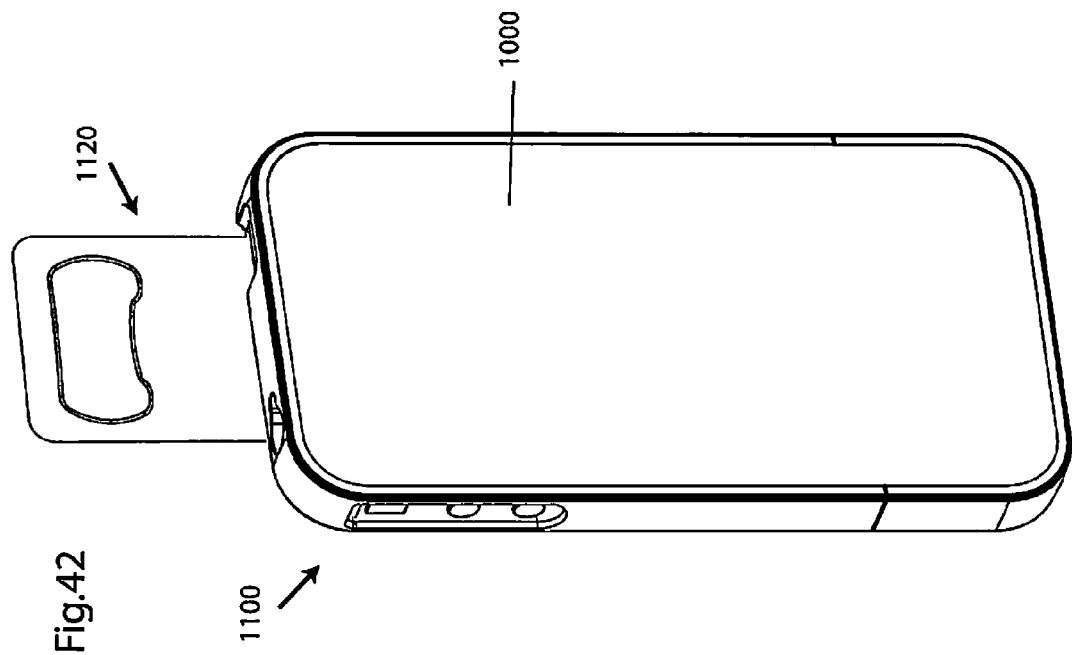
FIG. 42 shows the holder of FIG. 38 attached to a portable electronics device.
Figure 41:
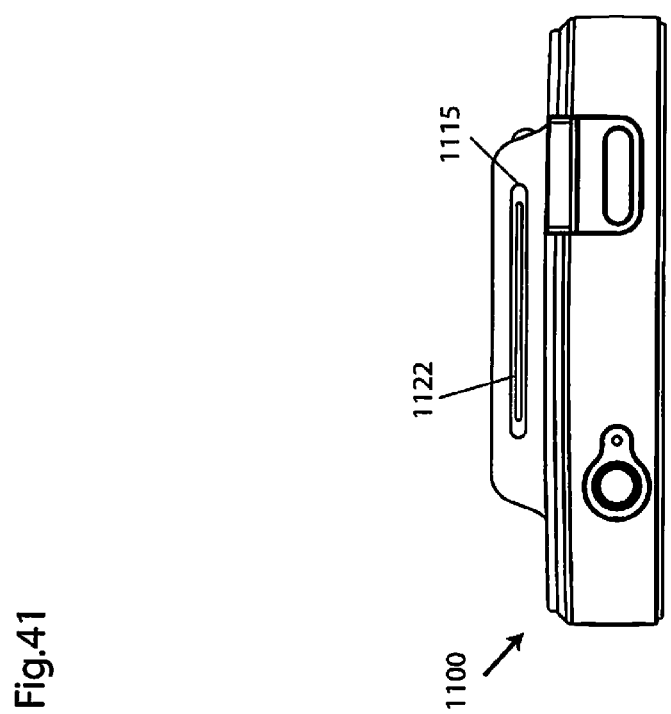
FIG. 41 is a top side view of the holder of FIG. 37 showing the slot for slidable bottle opener tab.

FIG. 37 is a planar view of another embodiment showing the backing holder 1100 with a slidable bottle cap opener tab 1120 in a retracted position. FIG. 38 is another view of the backing holder 1100 of FIG. 37 with the slidable bottle opener tab 1120 in an extended position. FIG. 39 is a left side view of the holder 1100 of FIG. 37 with the retracted slidable bottle opener tab 1120. FIG. 40 is a left side view of the holder 1100 of FIG. 38 with the extended slidable bottle opener tab 1120. FIG. 41 is a top side view of the holder 1100 of FIG. 37 showing the slot 1115 for slidable bottle opener tab. FIG. 42 shows the holder 1100 of FIG. 38 attached to a portable electronics device 1000.

Referring to FIGS. 37-42, the backing holder 1100 includes a raised housing 1110 that can be formed from thicker ABS plastic. For example, if the walls of the holder 1100 are approximately 2 millimeters thick, the walls of the housing 1110 can be thicker, such as approximately 3 millimeters thick. The housing 1110 can be positioned on the upper portion 1150 of the holder 1100. An opening 1152 in the upper portion 1150 can be used for a camera. The upper portion 1150 and the bottom portion 1160 of the holder 1100 can attach together similar to those parts previously described.

The top of the housing 1110 can have a slit opening 1115 that is sized large enough to allow the width of the sliding tab 1120 to slide therethrough. The sliding tab can have a generally rectangular shape with an upper edge 1122 and a bottom edge 1128 and a side handle 1124 with enlarged head that protrudes through and is slidable within and along an elongated slot 1117 in a side wall of the housing 1110. The handle 1124 allows for the user to pull up and extend the upper portion of the sliding bottle cap tab 1120 from the housing. Likewise pulling downward on the handle 1124 retracts the sliding bottle cap opener tab 1120 back into the housing 1110. Outwardly extending edges 1126 on the side(s) of the sliding tab 1120 form a width larger than the upper slot opening 115 to prevent the sliding tab 1120 from separating from the housing. The bottom edge 1128 of the sliding bottle cap opener tab 1120 stays below the upper slot opening 115 when the outwardly extended edges abut against an inner roof edge about the upper slot opening 115.

A bottle cap opening 1140 in the upper portion of the sliding bottle opener tab 1120 allows for the user to remove bottle caps from bottles of soda, beer, and the like. The sliding bottle cap opener tab 1120 can also have raised and/or indented strengthening ribs 1129 running down the tab 1120 to also strengthen the tab 1120 so as not to break when the bottle cap opener 1140 and/or can opener tab edge 1122 are being used.

The upper edge 1122 of the sliding tab 1120 can function similar to tab 950 of the previous embodiment to pry open caps and tabs on cans of soda, beer, and the like.

Figure 44:
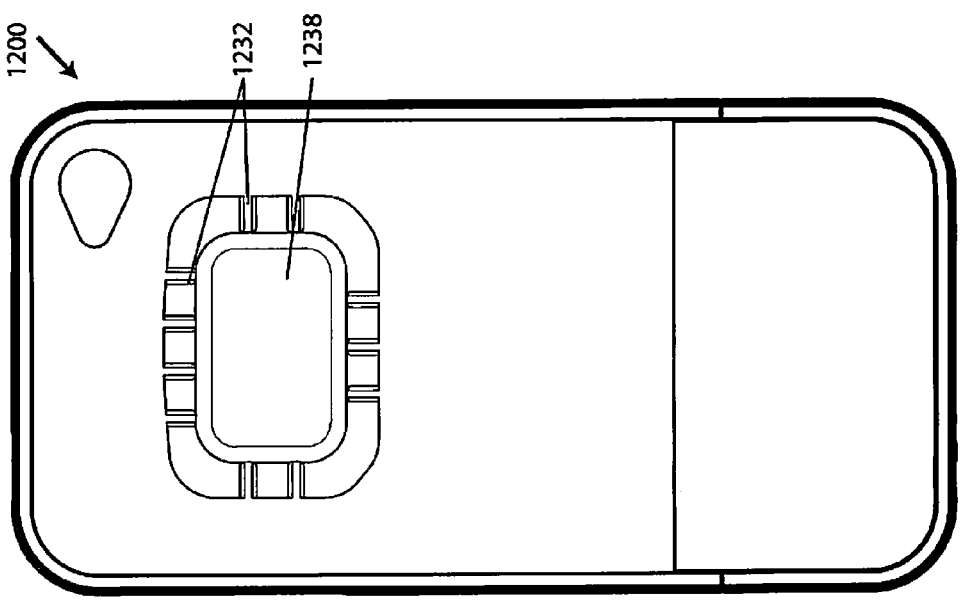
FIG. 44 is a planar view of the inside of the backing holder of FIG. 43.
Figure 43:
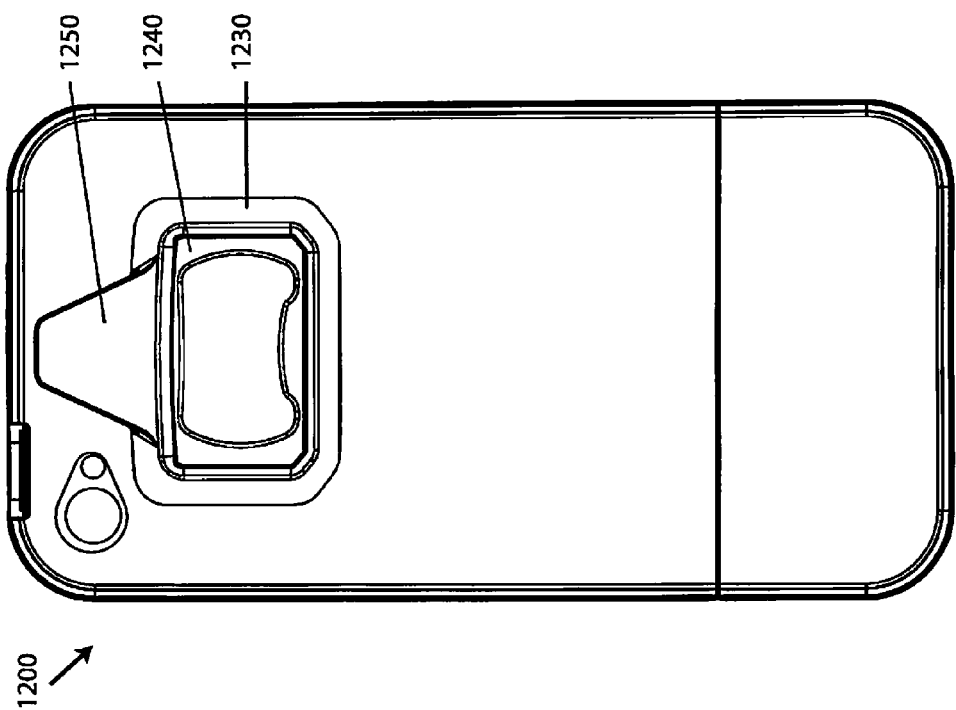
FIG. 43 is a planar view of another embodiment of the backing holder with a fixed bottle cap opener and parallel raised tabs for prying can tabs open.
Figure 47:
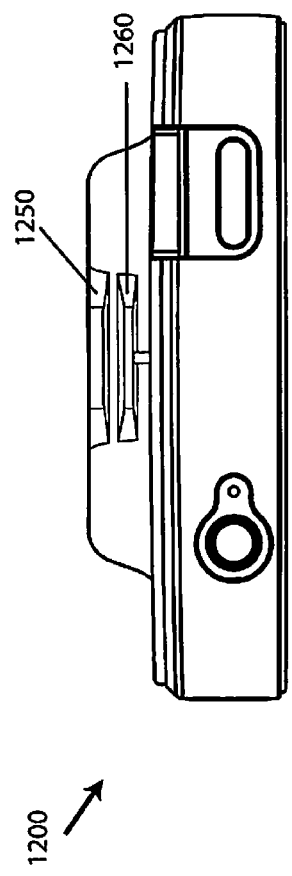
FIG. 47 is a top view of the backing holder of FIG. 44.
Figure 48:
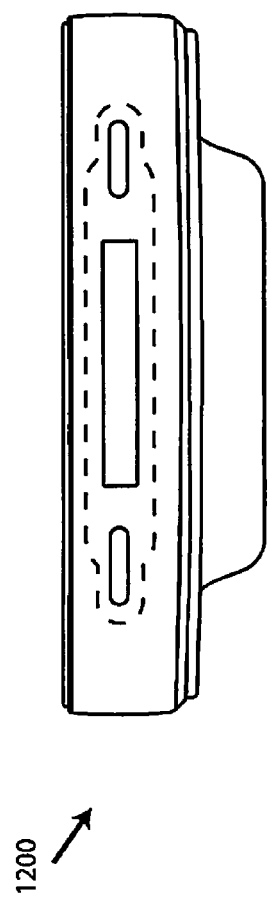
FIG. 48 is a bottom view of the backing holder of FIG. 44.

FIG. 43 is a planar view of another embodiment of the backing holder 1200 with a fixed bottle cap opener 1240 and parallel raised tabs 1250 for prying can tabs open. FIG. 44 is a planar view of the inside of the backing holder 1200 of FIG. 43. FIG. 45 is a left side view of the backing holder 1200 of FIG. 44. FIG. 46 is a right side view of the backing holder 1200 of FIG. 44. FIG. 47 is a top view of the backing holder 1200 of FIG. 44. FIG. 48 is a bottom view of the backing holder 1200 of FIG. 44.

Referring to FIGS. 43, 45 and 46, the exterior raised tab 1250 can have an outer inner top edge 1252 that allows the exterior raised tab 1250 to slide under a can pull tab of a soda or beer can. This angled edge 1252, helps locate the can pull tab between the outer raised tab 1250 and the inner raised tab 1260. Sandwiching the can pull tab between the parallel raised tabs 1250, 1260 allows for increased leverage to pry open the can tabs during use. Behind the inner raised tab 1260 can be a reinforcement member 1264 which reinforces the strength of the inner raised tab 1260 so that the inner raised tab 1260 is not pushed back against the case while the pull can tabs are being opened.

Referring to FIGS. 43-48, the backing holder 1200 includes a raised inwardly sloping side walls 1230 of a partially raised box with reinforcing ribs/members 1232 and an exterior opening 1240 in the outer face shaped to open bottle caps. The reinforcement ribs 1232 (similar to reinforcement ribs 932) are engineered to displace pressure that is generated when the opener is being used to open bottle caps, so that the electronics device and/or the actual case holder are not broken.

The exterior opening is formed inside of a metal type rim member. These components are similar to those described in the embodiment of FIGS. 25-36 described above. Protective cover 1238 protects the back of the supported electronic device from the outer bottle cap opening 1240. This holder 1200 includes double upwardly raised tabs 1250, 1260 that can have a generally triangular configuration with inwardly sloping sides and blunt top edge, that together can be useful for prying up and lifting can tabs on soda cans, beer cans, and the like.

Figure 50:
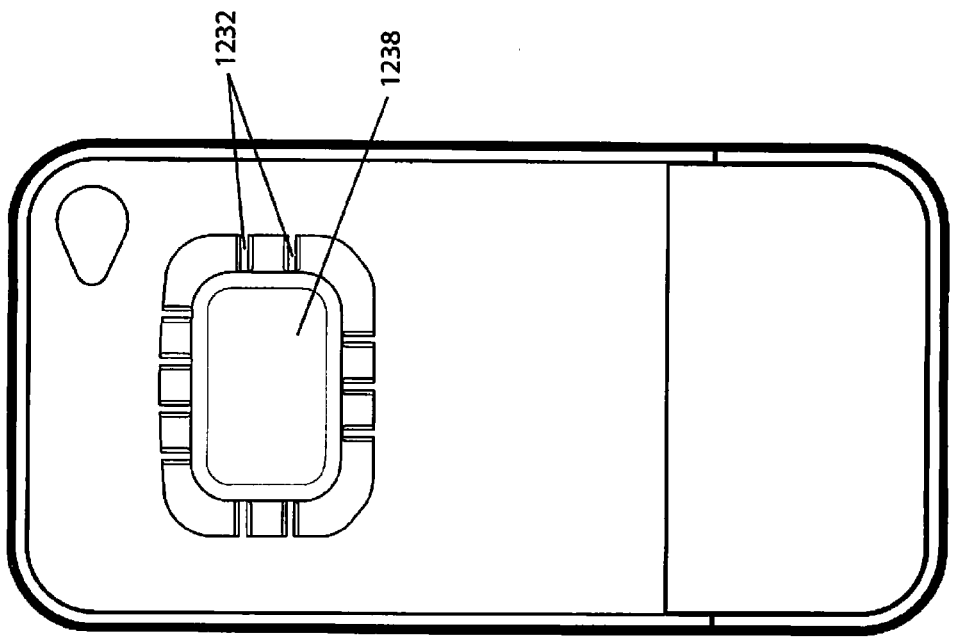
FIG. 50 is a planar view of the inside of the backing holder of FIG. 49.
Figure 49:
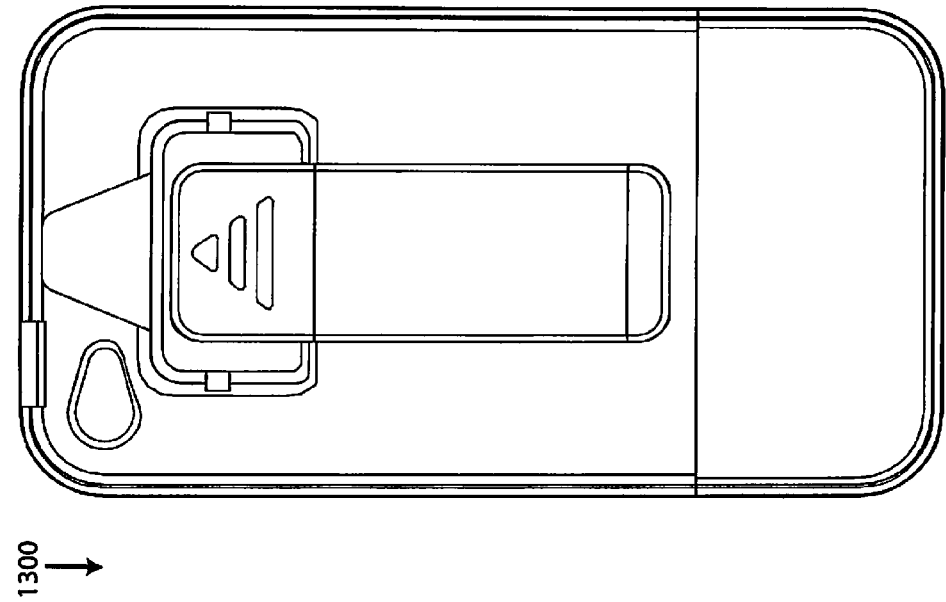
FIG. 49 is a planar view of another embodiment of the backing holder with a removable snap on belt clip adapter attached to the can opener on the previous backing holders.
Figure 52:
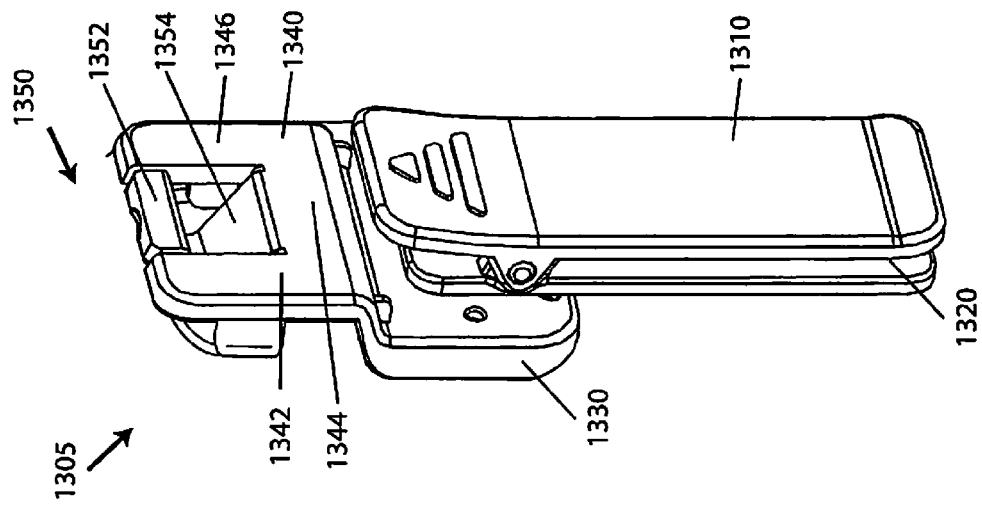
FIG. 52 is a perspective view of the belt clip adapter of FIG. 51 not attached.
Figure 51:
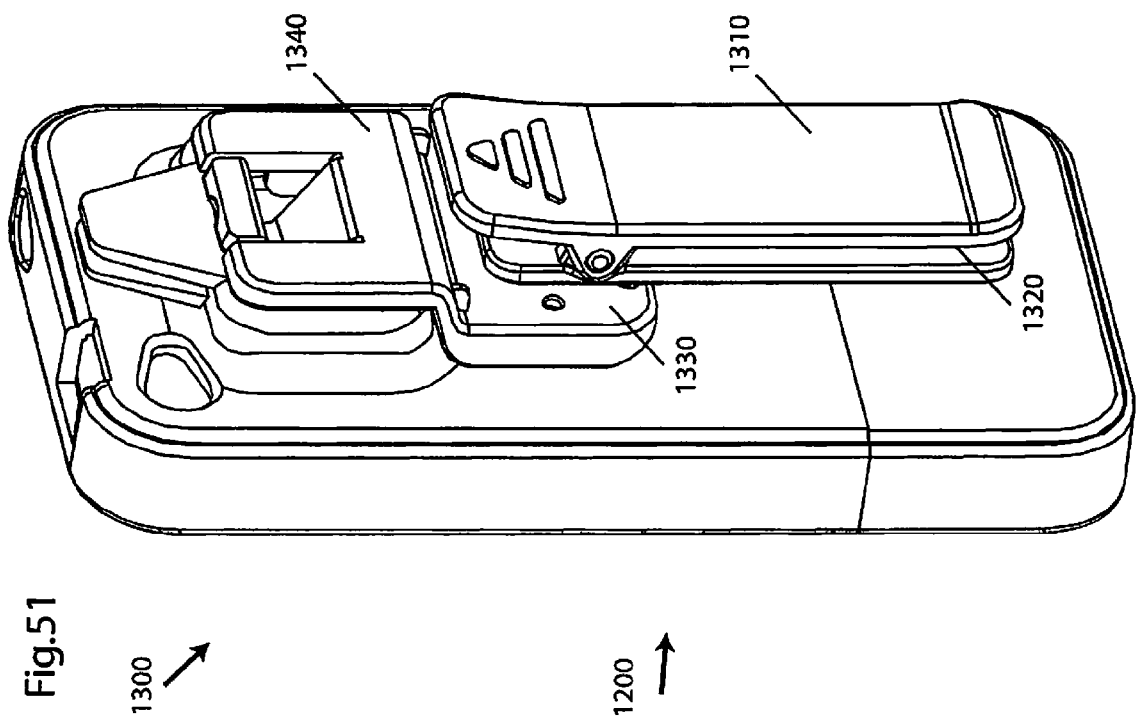
FIG. 51 is a perspective view of the backing holder with belt clip adapter of FIG. 49.

FIG. 49 is a planar view of another embodiment 1300 of the backing holder 1200 with a removable belt clip adapter 1305 attached to the can opener 1200 on the previous backing holders (see for example FIG. 43). FIG. 50 is a planar view of the inside of the backing holder 1200 of FIG. 49. FIG. 51 is a perspective view of the bottle cap opener backing holder 1200 with belt clip adapter 1305 of FIG. 49. FIG. 52 is a perspective view of the belt clip adapter 1305 of FIG. 51 not attached. FIG. 53 is a planar view of the outer side of the belt clip adapter 1305. FIG. 54 is a planar view of the inner side of the belt clip adapter 1305. FIG. 55 is a left side view of the belt clip adapter 1305 of FIG. 53 with partial cut-away of the depressible button 1350 in a release position. FIG. 56 is another left side view of the belt clip adapter 1305 of FIG. 53 with partial cut-away of the depressible button 1350 in an expanded lock position.

Referring to FIGS. 52-56, the belt clip adapter 1305 can include a pivotal clip member 1310 having a depressible raised end 1312 with raised surface edges 1313, a pair of pivoting hinges 1315 and an outer pivotal grip end 1316 with inwardly facing raised grip edge 1318. The pivotal member 1310 can be attached to a fixed bottom clip member 1320 by attaching the pivoting hinges 1315 of the pivotal member 1310 to the pivoting hinges 1325 of the fixed bottom clip member 1320. The fixed bottom clip member 1320 can be attached at end 1322 to an extended base 1330 on the belt clip adapter 1305. The fixed bottom clip member 1320 can also have an outer grip end 1326 with upwardly facing raised grip edge 1328. A biasing spring 1335 such as but not limited to a leaf spring, and the like can bias the gripping edges 1318, 1328 of the pivoting clip member 1310 and fixed clip member 1320 against one another.

The adapter base 1340 of the belt clip adapter 1305 can include a left leg 1342, a middle portion 1344 connecting the left leg 1342 to a right leg 1346, and a depressible U-shaped button 1350 between the left leg 1342 and the right leg 1346. The depressible U-shaped button 1350 and respective parts 1342, 1344, 1346, base 1340 and extended base 1330 can be a single piece molded from plastic and the like. The depressible U-shaped button 1350 can include a lower facing U-shape member 1354 with a top portion having upwardly raised button edge, and a lower portion having a hook edge 1355. Three lower extending leg type prongs 1362, 1364 and 1366 can extend downward from the left leg 1342, connection portion 1344 and right leg 1346, with each of the prongs 1362, 1364, 1366 having outwardly facing respective hook ends 1363, 1365, 1367.

Figure 57:
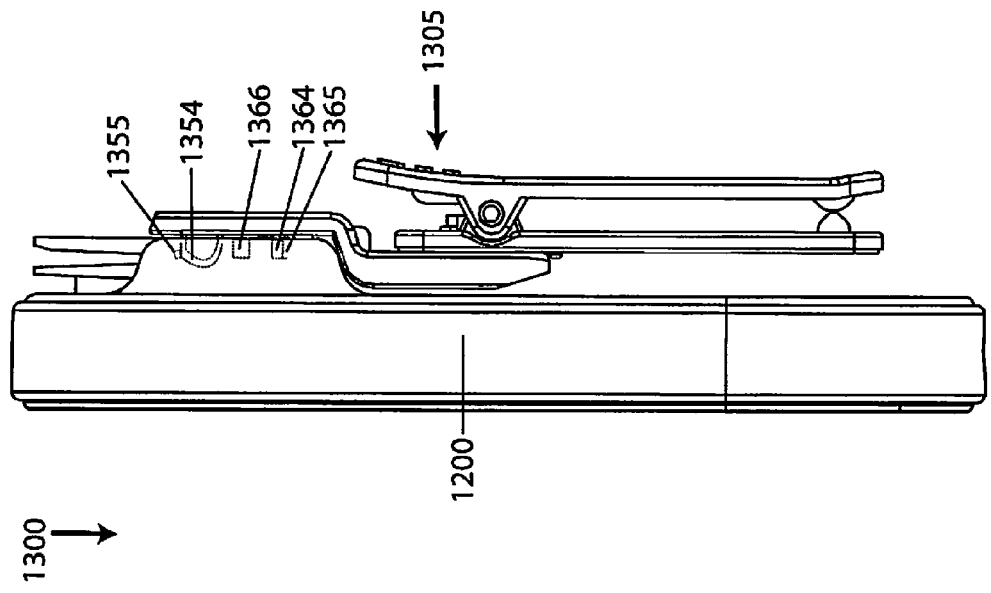
FIG. 57 is a right side planar view of the holder of FIG. 51 with attached belt clip.
Figure 58:
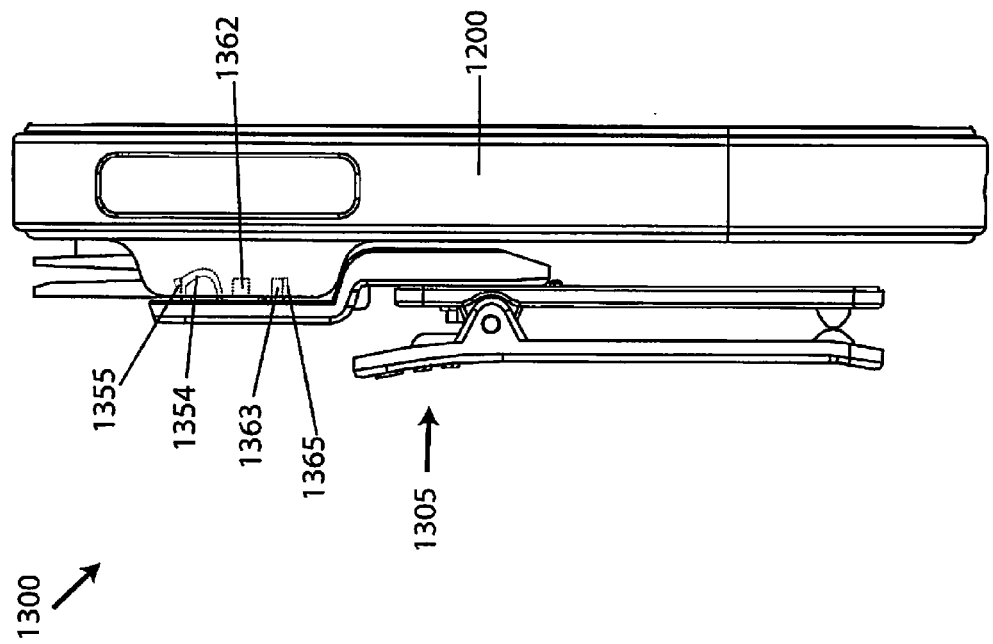
FIG. 58 is a left side planar view of the holder of FIG. 51 with attached belt clip.

FIG. 57 is a right side planar view of the assembled holder 1300 of FIG. 51 with belt clip adapter 1305 attached to a bottle cap opener holder 1200. FIG. 58 is a left side planar view of the assembled holder 1300 of FIG. 51 with belt clip adapter 1305 attached to a bottle cap opener holder 1200.

Referring to FIGS. 51-58, to attach the belt clip adapter 1305 to the holder 1200, a user can hook the hook ends 1363, 1365, 1367 of the downwardly protruding prongs 1362, 1364, 1366 on adapter base 1340 into the opening to hook under the lower portion of the metal rim 1240 of the bottle opener 1200 (FIG. 43). The convex curved shape of the U-shape member 1354 and bottom of the hook end 1355 can be curved so as to bend so that the outer edge of the hook end 1355 can hook under an upper rim edge of the metal rim 1240 on bottle opener 1200. Additionally, the bottom of the prong hooks can be angled and/or rounded to allow the prongs to bend slightly backward to pass into the opening defined by the rim for the bottle cap opener 1240. To release the belt clip adapter 1305, the user can push downward on raised button edge 1352 of depressible button 1350 which moves the U-shaped member 1354 downward (FIG. 55) allowing the hook end 1355 to detach from underneath the upper portion of rim 1240, which allows the belt clip adapter 1305 to detach from the bottle cap opener holder 1200.

The novel belt clip adapter 1305 can be used to attach to other shapes of bottle cap openers, and the like. The gripping outer ends 1318, 1328 of the clip members 1310, 1320, can allow for the entire holder 1300 to easily attach and detach from belts, pockets, and the like, with little effort.

Figure 59:
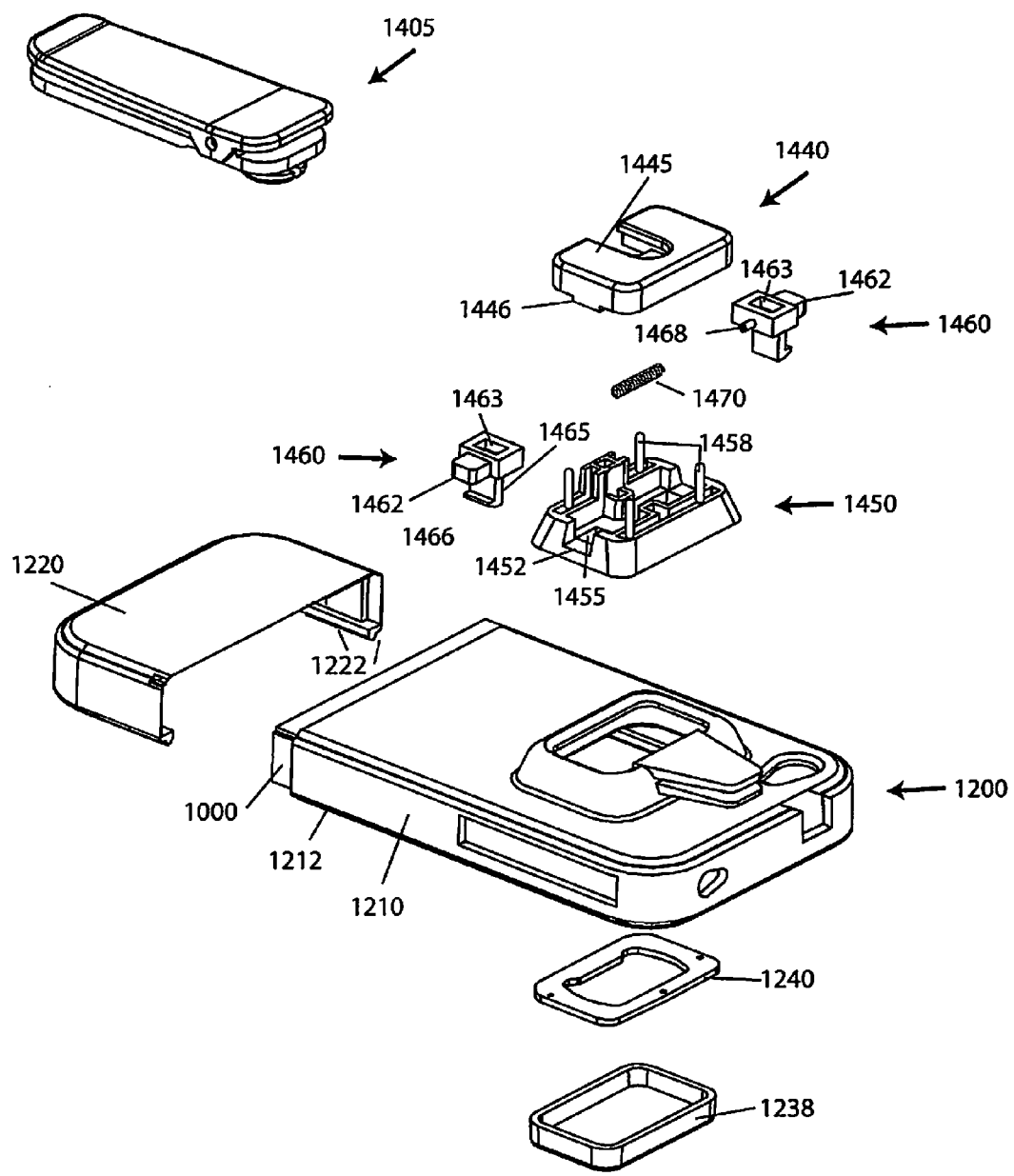
FIG. 59 is an exploded perspective view of another embodiment of another holder with a spring attached belt clip with housing components.
Figure 60:
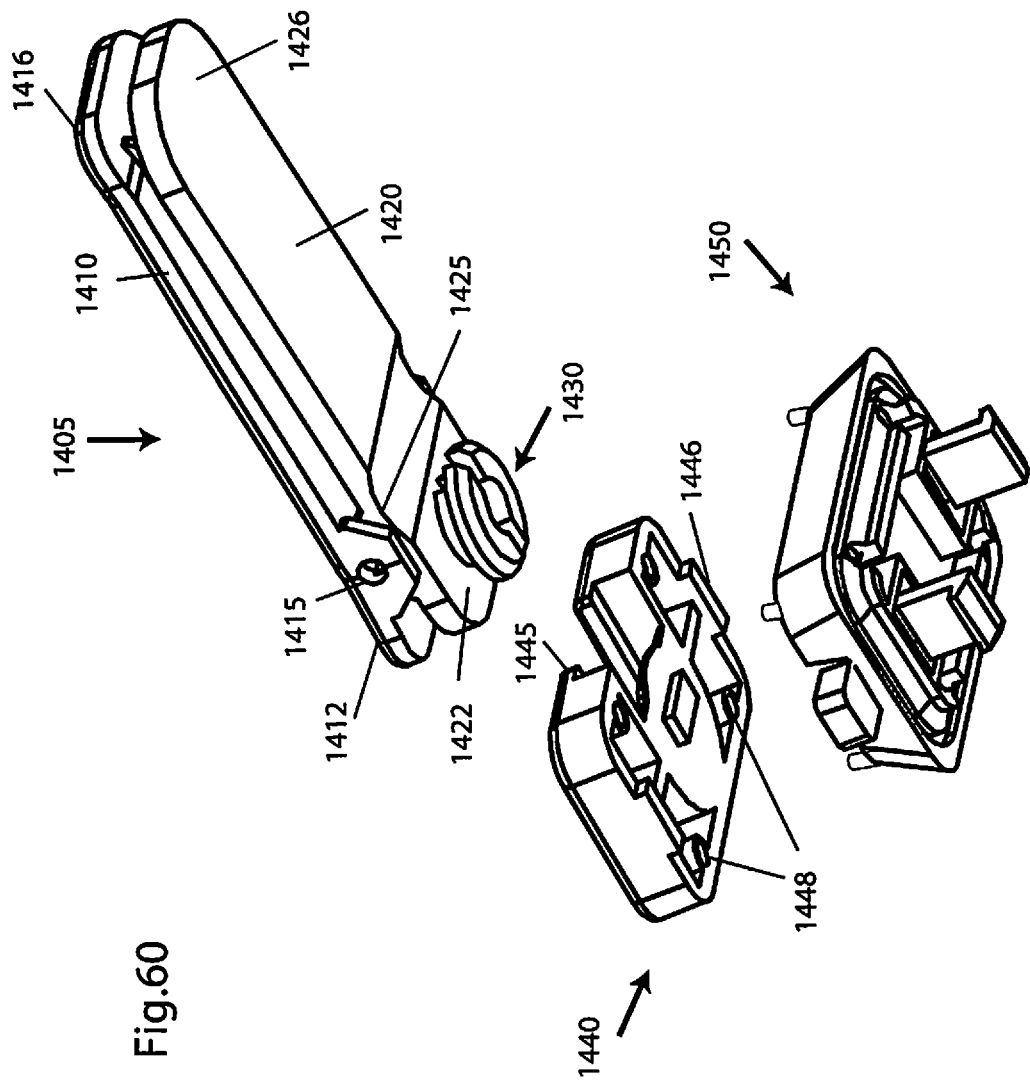
FIG. 60 is a partial exploded view of the belt clip and assembled housing components.

FIG. 59 is an exploded perspective view of another embodiment holder 1400 with a spring attached belt clip adapter 1405 with housing components. FIG. 60 is a partial exploded view of the belt clip adapter 1405 and assembled housing components.

Referring to FIG. 59, the top 1210 of case holder 1200 and the bottom 1220 of case holder 1200 can have front sides with raised chamfered (beveled) edges 1212, 1222. The raised edges 1212, 1222 allow for the outer face of the electronics device 1000 to sit back in the case holder 1200. These raised outer edges 1212, 1222 are intended to help protect the electronics device 1000 so that when the case holder 1200 is laid on a solid type surface such as a table top, a screen (face) on the electronics device 1000 does not contact the surface.

Referring to FIGS. 59-60, the belt clip adapter 1405 can include an upper pivotal clip member 1410 with depressible end 1412 (that can have a raised gripping surface) and an outer clamp end 1416. The upper pivotal clip member 1410 can attach by pivoting hinges 1415 to the pivoting hinges 1425 on a bottom fixed clip member 1420 that can also have an outer clamp end 1426. The bottom fixed clip member 1420 has a lower attachment end with a pair of bendable disc halves 1430. The disc halves 1430 can be plastic and be bendable to one another.

The belt clip holding piece 1440 can include an upper surface with a U-shaped channel cut-out 1445 having an inwardly protruding rim edge. On the sides of the holding piece 1440 can be downwardly extending protrusions 1446. Underneath the holding piece 1440 can be female sockets 1448 (four are shown in FIG. 60). The spring housing and clip base 1450 can have side cut-outs 1452 for the button ends 1462 (to be described), and through-holes 1455 (for the downwardly extending prongs 1465 to be described), and upwardly facing male members 1458. There can be two spring clip buttons 1460, each having outwardly extending depressible button ends 1462, and downwardly extending prongs 1465 with hook ends 1466. On the inner sides of the buttons can be tips 1468 so that a spring 1470 can be supported between each of the buttons 1460.

To be assembled, the downwardly extending prongs 1465 can pass through the vertical through holes 1455 in the clip base 1450 so that the depressible button ends 1462 extend outward from the side cut-outs 1452 in the clip base 1450. The spring biased buttons 1460 are held in place by the downwardly extending protrusions 1446 that fit into enlarged cavities 1463 in the top of the buttons 1460. The enlarged cavities 1463 allow for the buttons 1460 to horizontally move in and out of the clip base 1450 without separating entirely from the clip base 1450. The belt clip holding piece 1440 can be attached to the bottom spring housing and clip base 1450 by forming a friction fitting by inserting the male members 1458 into the female sockets 1448.

Pushing the button ends 1462 on each of the buttons 1460 inwardly to compress the spring 1470 allows for the assembled holding piece 1440 and clip base 1450 to attach to the bottle opener rim 1440 in the rear box of the bottle cap opener holder 1200. Additionally, the holding piece 1440 and attached clip base 1450 can attach to the bottle opener by having the bottoms of each of the hook ends 1466 of the buttons can be angled to allow for the hook ends 1466 to push into the opening formed within the rim 1240. The holding piece 1440 and attached clip base 1450 can be detached from the bottle cap holder 1200 by pushing the button ends 1462 in and lifting up the holding piece 1440 and attached clip base 1450.

Figure 61:
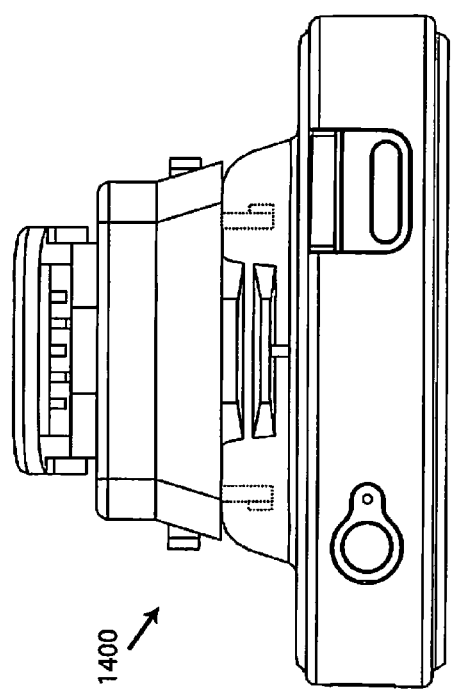
FIG. 61 is a top view of the belt clip and holder of FIGS. 59-60 attached to one another.
Figure 62:
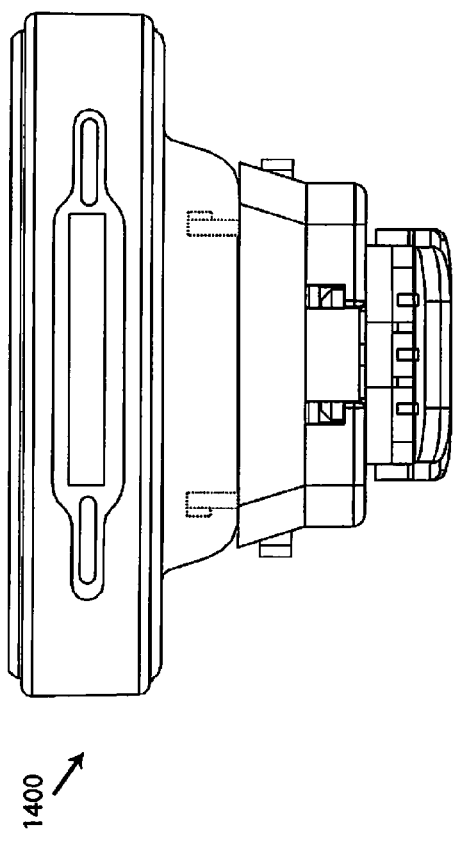
FIG. 62 is a bottom view of the attached belt clip and holder of FIG. 61.
Figure 64:
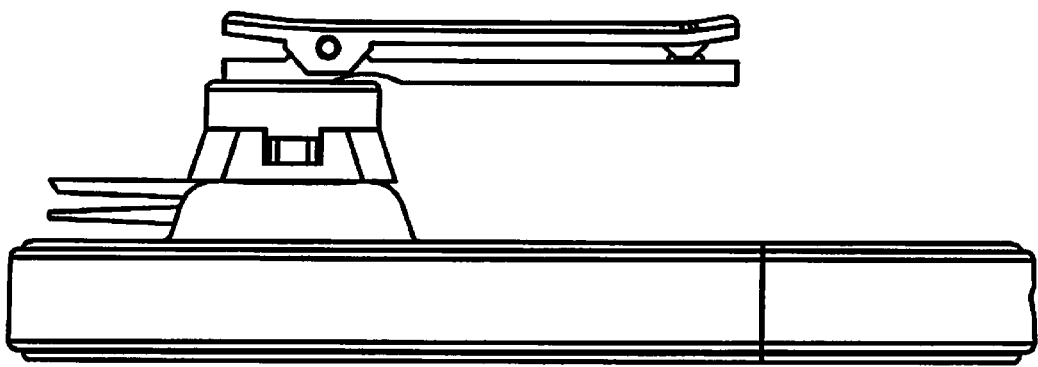
FIG. 64 is a right side view of the attached belt clip and holder of FIG. 61.
Figure 63:
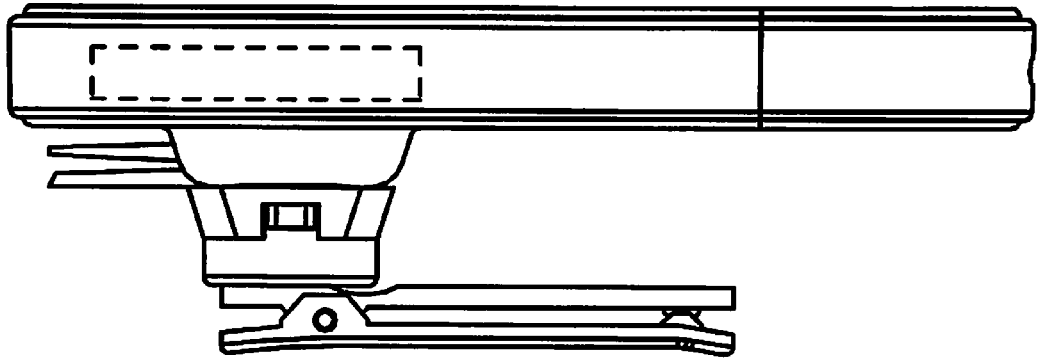
FIG. 63 is a left side view of the attached belt clip and holder of FIG. 61.

FIG. 61 is a top view of the belt clip adapter 1405 and holder 1200 of FIGS. 59-60 attached to one another. FIG. 62 is a bottom view of the attached belt clip adapter 1405 and holder 1200 of FIG. 61. FIG. 63 is a left side view of the attached belt clip adapter 1405 and holder 1200 of FIG. 61. FIG. 64 is a right side view of the attached belt clip adapter 1405 and holder 1200 of FIG. 61.

The belt clip adapter 1405 can be attached to the assembled holding piece 1440 and clip base 1450, by slidably inserting the bendable disc halves 1430 into the U-shaped channel 1445. The disc halves 1430 can compress together forming a tight fit. The belt clip 1405 can be rotated in the U-shaped channel 1445 to allow for the holder and supported electronic device to be carried in a vertical orientation or a horizontal orientation or at any angled orientation as desired. The belt clip adapter 1405 can attach to belts and pockets similar to the previously described embodiment.

Another version of the belt clip adapter 1405 can allow for the disc halves portion 1430 to be sized to directly fit into the bottle cap opener formed by the rim 1440 on the bottle cap opener holder 1200.

Figure 65:
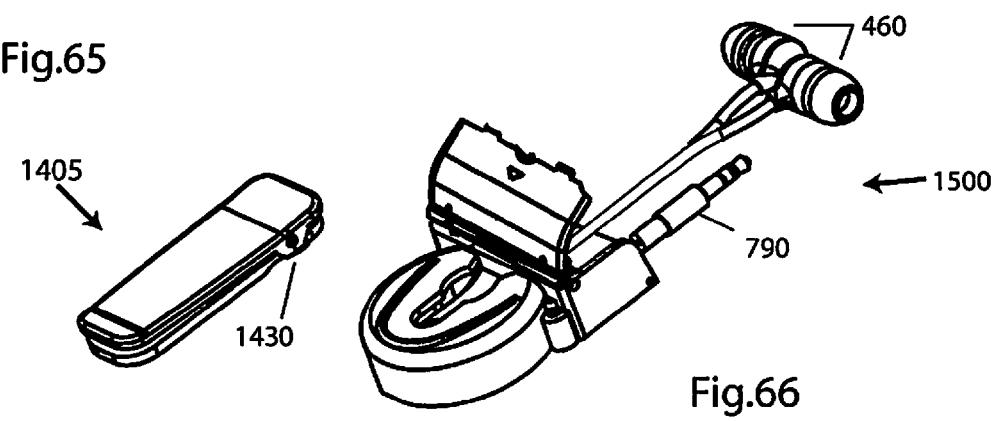
FIG. 65 is a perspective view of a belt clip adapter and retractable components with headpiece and plug in jack removed from the case holders.

FIG. 65 is a perspective view of a belt clip adapter 1405 and retractable components 1500 with headpiece 460 and plug in jack 790A removed from the case holders of the previous embodiments. These components can be modular type components that can be separately used without the case holders. Likewise, the previously described case holders can be used without the retractable components and headpiece 460 and plug in jack 790A.

Figure 66:
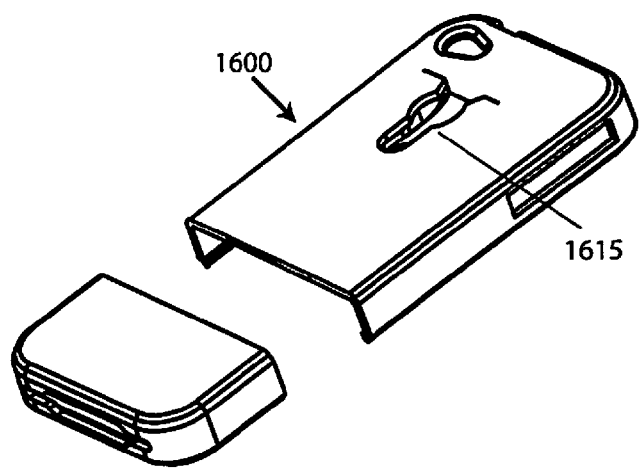
FIG. 66 is a perspective view of another embodiment of a holder with keyhole slot.
Figure 67:
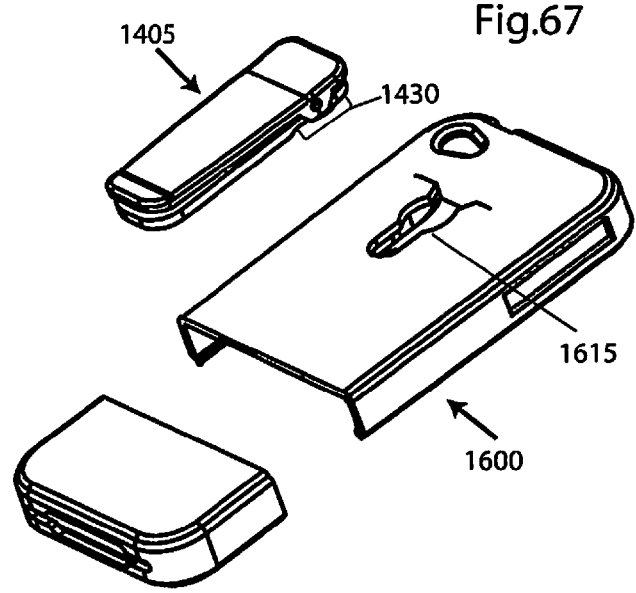
FIG. 67 is another perspective view of the holder of FIG. 66 being used with the belt clip adapter.

FIG. 66 is a perspective view of another embodiment of a holder 1600 with keyhole slot 1615 in the back wall of the case holder 1600. A protective cover wall can be located inside the case behind the keyhole slot 1615 to protect the electronic device. FIG. 67 is another perspective view of the holder 1600 of FIG. 66 being used with the belt clip adapter 1405. The bendable disc halves 1430 (shown and described in reference to FIG. 60) on the belt clip adapter 1405, can be inserted into the larger opening of the keyhole slot 1615, and slid into the smaller opening, locking the belt clip adapter 1405 to the case holder 1600.

As previously discussed, the headpiece can be a single earphone, two earphones or a small headset. The holders described and shown can be made from materials such as but not limited to injection molded plastic (such as ABS plastic), composites, rubber type materials, metal, combinations thereof, and the like. Additionally, the holders can be made of other materials, such as but not limited to leather, cloth, linen, and other natural materials.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A portable accessory holder for handheld electronics, comprising:
   a backplate having a support frame sleeve sized to fit substantially about perimeter edges of a portable handheld electronic device, the backplate having a front face wall for substantially covering a rear of the portable handheld electronic device, the backplate having a rear face wall;
   a slightly raised surface extending out from an upper surface portion of the rear face wall of the backplate that is substantially parallel to a longitudinal axis of the backplate; and
   a bottle opener fixably attached to the backplate of the accessory holder, and the bottle opener being accessible from the raised surface, the bottle opener having an opening therein;
   a belt clip having a fastening adapter for locking and unlocking the belt clip from the opening in the bottle cap opener.

2. The accessory holder of claim 1, further comprising:
   a single upwardly raised tab attached to the box adaptable for lifting bottle caps and can tabs.

3. The accessory holder of claim 1, further comprising:
   a pair of upwardly raised parallel tabs attached to the box for lifting can tabs.

4. The accessory holder of claim 3, wherein each one of the parallel tabs has a generally triangular configuration.

5. The accessory holder of claim 1, wherein the belt clip includes:
   a two members which are pivotally attached to one another.

6. The accessory holder of claim 1, wherein the adapter includes:
   a depressible molded switch having a first position where the belt clip is locked to the bottle cap opener, and a second position where the belt clip is detachable from the bottle cap opener.

7. The accessory holder of claim 6, further comprising:
   at least a pair of downwardly extending prongs having lower ends which attach underneath edges of a rim about the opening to the bottle cap opener.

8. The accessory holder of claim 1, further comprising:
   a slit in the slightly raised surface
   a tab having the bottle opener, wherein the tab is slidable in and out of the slit in the box.

9. The accessory holder of claim 8, wherein the slidable tab includes a handle for allowing the tab to slide in and out of the slot in the slightly raised surface.

10. The accessory holder of claim 8, wherein the bottle opener is fixed to the outer face of the slightly raised surface.

11. A portable accessory holder for handheld electronics, comprising:
   a backplate having a support frame sleeve sized to fit substantially about perimeter edges of a portable handheld electronic device;
   a slightly raised backing on an upper surface portion of the backplate, the slightly raised backing having a substantially planar outer face that is substantially parallel to a longitudinal axis of the backplate; and
   a bottle opener fixably attached to the planar outer face of the slightly raised backing;
   a belt clip; and
   an adapter attaching and detaching the belt clip from an opening in the bottle cap opener, the adapter including
   a depressible spring loaded switch having a first position where the belt clip is locked to the bottle cap opener, and a second position where the belt clip is detachable from the bottle cap opener.

12. The accessory holder of claim 11, wherein the belt clip includes:
   a two members which are pivotally attached to one another.

13. A portable accessory holder for handheld electronics, comprising:
   a backplate having a support frame sleeve sized to fit substantially about perimeter edges of a portable handheld electronic device;
   a slightly raised backing on an upper surface portion of the backplate, the slightly raised backing having a substantially planar outer face that is substantially parallel to a longitudinal axis of the backplate; and
   a bottle opener fixably attached to the planar outer face of the slightly raised backing;
   a belt clip; and
   an adapter attaching and detaching the belt clip from an opening in the bottle cap opener, the adapter including
   wherein the belt clip includes:
   a bendable disc that for attachment to the bottle cap opener.

14. The accessory holder of claim 1, wherein the belt clip is rotatable to allow for the backplate to be held vertically and horizontally and at an angle to the belt clip.

\* \* \* \* \*